US012547672B2

(12) United States Patent
Narayanamoorthy et al.

(10) Patent No.: US 12,547,672 B2
(45) Date of Patent: Feb. 10, 2026

(54) ACCELERATOR FOR SPARSE-DENSE MATRIX MULTIPLICATION

(71) Applicant: Intel Corporation, Santa Clara, CA (US)

(72) Inventors: Srinivasan Narayanamoorthy, Hillsboro, OR (US); Nadathur Rajagopalan Satish, Santa Clara, CA (US); Alexey Suprun, Beaverton, OR (US); Kenneth J. Janik, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 32 days.

(21) Appl. No.: 18/388,507

(22) Filed: Nov. 9, 2023

(65) Prior Publication Data

US 2024/0070226 A1 Feb. 29, 2024

Related U.S. Application Data

(63) Continuation of application No. 17/229,550, filed on Apr. 13, 2021, now Pat. No. 11,829,440, which is a
(Continued)

(51) Int. Cl.
*G06F 17/16* (2006.01)
*G06F 7/544* (2006.01)
(Continued)

(52) U.S. Cl.
CPC ............ *G06F 17/16* (2013.01); *G06F 7/5443* (2013.01); *G06F 9/3001* (2013.01);
(Continued)

(58) Field of Classification Search
CPC ................... G06F 17/16; G06F 7/5443; G06F 9/30–3001; G06F 9/30145;
(Continued)

(56) References Cited

U.S. PATENT DOCUMENTS

| | | | |
|---|---|---|---|
| 5,673,407 | A | 9/1997 | Poland et al. |
| 9,558,156 | B1 | 1/2017 | Bekas et al. |

(Continued)

FOREIGN PATENT DOCUMENTS

| | | | |
|---|---|---|---|
| CN | 107239823 | A | 10/2017 |

OTHER PUBLICATIONS

A. Buluc et al, Reduced-Bandwidth Multithreaded Algorithms for Sparse Matrix-Vector Multiplication, IEEE Computer Society 2011 IEE International Parallel & Distributed Processing Symposium, 2011 (Year: 2011), pp. 721-733.

(Continued)

*Primary Examiner* — Emily E Larocque
(74) *Attorney, Agent, or Firm* — NICHOLSON DE VOS WEBSTER & ELLIOTT LLP

(57) ABSTRACT

Disclosed embodiments relate to an accelerator for sparse-dense matrix instructions. In one example, a processor to execute a sparse-dense matrix multiplication instruction, includes fetch circuitry to fetch the sparse-dense matrix multiplication instruction having fields to specify an opcode, a dense output matrix, a dense source matrix, and a sparse source matrix having a sparsity of non-zero elements, the sparsity being less than one, decode circuitry to decode the fetched sparse-dense matrix multiplication instruction, execution circuitry to execute the decoded sparse-dense matrix multiplication instruction to, for each non-zero element at row M and column K of the specified sparse source matrix generate a product of the non-zero element and each corresponding dense element at row K and column N of the specified dense source matrix, and generate an accumulated sum of each generated product and a previous value of a corresponding output element at row M and column N of the specified dense output matrix.

18 Claims, 21 Drawing Sheets

Related U.S. Application Data continuation of application No. 16/799,586, filed on Feb. 24, 2020, now Pat. No. 10,984,074, which is a continuation of application No. 15/938,924, filed on Mar. 28, 2018, now Pat. No. 10,572,568.

(51) Int. Cl.

| | |
|---|---|
| ***G06F 9/30*** | (2018.01) |
| ***G06F 9/38*** | (2018.01) |
| ***G06N 3/00*** | (2023.01) |

(52) U.S. Cl.

CPC ...... *G06F 9/30036* (2013.01); *G06F 9/30038* (2023.08); *G06F 9/30145* (2013.01); *G06F 9/3016* (2013.01); *G06F 9/383* (2013.01); *G06F 9/3887* (2013.01); *G06F 9/3888* (2023.08); *G06N 3/00* (2013.01)

(58) Field of Classification Search

CPC . G06F 9/30156; G06F 9/30181–30196; G06F 9/3867; G06F 9/3824; G06F 9/383; G06F 9/3836; G06F 9/3887; G06F 9/3893; G06N 3/02; G06N 3/04; G06N 3/06; G06N 3/063

See application file for complete search history.

(56) References Cited

U.S. PATENT DOCUMENTS

| | | | |
|---|---|---|---|
| 2001/0011291 | A1 | 8/2001 | Arakawa et al. |
| 2004/0133617 | A1 | 7/2004 | Chen et al. |
| 2007/0198621 | A1 | 8/2007 | Lumsdaine et al. |
| 2012/0072703 | A1 | 3/2012 | Srinivasan et al. |
| 2015/0277904 | A1 | 10/2015 | Espasa et al. |
| 2016/0283240 | A1 | 9/2016 | Mishra et al. |
| 2016/0378465 | A1 | 12/2016 | Venkatesh et al. |
| 2017/0337156 | A1 | 11/2017 | Yadavalli |
| 2018/0046900 | A1 | 2/2018 | Dally et al. |
| 2018/0121377 | A1 | 5/2018 | Woo et al. |
| 2018/0129935 | A1 | 5/2018 | Kim et al. |
| 2018/0253635 | A1 | 9/2018 | Park |
| 2019/0179868 | A1 | 6/2019 | Mir et al. |
| 2019/0278600 | A1 | 9/2019 | Frumkin et al. |

OTHER PUBLICATIONS

A. Morad, L. Yavits, and R. Ginosar, "Efficient dense and sparse matrix multiplication on GP-SIMD", 24th International Workshop on Power and Timing Modeling Optimization and Simulation (PATMOS), pp. 1-8, 2014 (Year: 2014).

Acer et al., "Improving performance of sparse matrix dense matrix multiplication on large-scale parallel systems", Parallel Computing, vol. 59, 2016, pp. 71-96.

Applicant Initiated Interview Summary, U.S. Appl. No. 15/938,924, Oct. 22, 2019, 2 pages.

Communication pursuant to Article 94(3) EPC, EP App. No. 20199012.4, Aug. 5, 2021, 7 pages.

Corrected Notice of Allowability, U.S. Appl. No. 16/921,823, Oct. 27, 2020, 6 pages.

D.A. Patterson et al., Computer Organization and Design: The Hardware/Software Interface, Elsevier Science & Technology, 2007 (Year: 2007).

E. Saule et al., "Performance Evaluation of Sparse Matrix Multiplication Kernels on Intel Xeon Phi", arXiv:1302.1078v1 [cs.PFI, 2013 (Year: 2013), pp. 1-19.

European Search Report and Search Opinion, EP App. No. 20199012.4, Jan. 26, 2021, 6 pages.

European Search Report and Search Opinion, EP App. No. EP19157044.9, Aug. 2, 2019, 9 pages.

H. Aktulga, et al, Optimizing Sparse Matrix-Multiple Vectors Multiplication for Nuclear Configuration Interaction Calculations, IEEE Computer Society, 2014 IEEE 28th International Parallel & Distributed Processing Symposium, 2014 (Year: 2014), pp. 1213-1222.

IBM (Registered), Power ISATM, Version 3.0B, 2017 (Year: 2017).

Intel (Registered) 64 and IA-32 Architectures Software Developer's Manual, vol. 2(2A, 2B, 2C, & 2D): Instruction Set Reference, A-Z, 2016 (Year: 2016), pp. 1-33.

Intel (Registered) Math Kernel Library Inspector-executor Sparse BLAS Routines, Reference Manual, 2015 (Year: 2015).

K. Matam, et al., "Sparse Matrix-Matrix Multiplication on Modern Architectures", 19th International Conference on High Performance Computing, 2012 (Year: 2012), 10 pages.

Koanantakool et al., "Communication-Avoiding Parallel Sparse-Dense Matrix-Matrix Multiplication", 2016 IEEE International Parallel and Distributed Processing Symposium, May 23, 2016, pp. 842-853.

Morad A., et al., "Efficient Dense and Sparse Matrix Multiplication on GP-SIMD," 24th International Workshop on Power and Timing Modeling, Optimization and Simulation (Patmos), IEEE 2014, Sep. 29, 2014, pp. 1-8.

Non-Final Office Action, U.S. Appl. No. 15/938,924, Jun. 21, 2019, 14 pages.

Non-Final Office Action, U.S. Appl. No. 16/799,586, Aug. 4, 2020, 20 pages.

Non-Final Office Action, U.S. Appl. No. 17/229,550, Feb. 22, 2023, 17 pages.

Notice of Allowance and Fees Due (PTOL-85) Mailed on Dec. 24, 2020 for U.S. Appl. No. 16/799,586.

Notice of Allowance, U.S. Appl. No. 15/938,924, Oct. 22, 2019, 10 pages.

Notice of Allowance, U.S. Appl. No. 16/799,586, Mar. 17, 2021, 4 pages.

Notice of Allowance, U.S. Appl. No. 16/921,823, Aug. 13, 2020, 15 pages.

Notice of Allowance, U.S. Appl. No. 17/229,550, Aug. 1, 2023, 5 pages.

NVIDIA (Registered), Parallel Thread Execution ISA, Application Guide, 2017 (Year: 2017), 277 pages.

Office Action, EP App. No. 19157044.9, Mar. 24, 2021, 8 pages.

Office Action, EP App. No. 20199012.4, Feb. 2, 2023, 10 pages.

Office Action, EP App. No. 20199012.4, Feb. 5, 2021, 8 pages.

Office Action, EP App. No. 20199012.4, Feb. 7, 2022, 9 pages.

Office Action, EP App. No. 20199012.4, Jul. 28, 2022, 8 pages.

Tao et al., "An efficient sparse-dense matrix multiplication on a multicore system", 2017 IEEE 17th International Conference on Communication Technology (ICCT), 2017, pp. 1880-1883.

X. Liu, et al., "Efficient Sparse Matrix-Vector Multiplication on x86-Based Many-Core Processors", ICS'13, 2013 (Year: 2013), 10 pages.

X. Xie et al., "Exploiting Sparsity to Accelerate Fully Connected Layers of CNN-Based Applications on Mobile SoCs", ACM Transactions on Embedded Computing Systems, vol. 17, No. 2, Article 27, 2017 (Year: 2017), pp. 37:1-37:25.

Yavits L et al., "Sparse Matrix Multiplication on an Associative Processor", IEEE Transactions on Parallel and Distributed Systems, IEEE Service Center, Los Alamitos, CA, US, vol. 26, No. 11, Nov. 1, pp. 3175-3183.

Yavits L., et al., "Sparse Matrix Multiplication on an Associative Processor," IEEE Transactions on Parallel and Distributed Systems, vol. 26 (11), Nov. 2015, pp. 3175-3183.

Decision to grant, EP App. No. 20199012.4, Mar. 14, 2024, 2 pages.

Intention to Grant, EP App. No. 19157044.9, Aug. 20, 2024, 6 pages.

Extended European Search Report and Search Opinion, EP App. No. 24203575.6, Jan. 31, 2025, 8 pages.

Intention to Grant, EP App. No. 20199012.4, Nov. 17, 2023, 8 pages.

Jouppi et al., "In-Datacenter Performance Analysis of a Tensor Processing Unit", Available Online at <https://arxiv.org/abs/1704.04760>, Apr. 16, 2017, 17 pages.

Notice of Allowance, CN App. No. 202010951887.8, Mar. 29, 2024, 4 pages (2 pages of English Translation and 2 pages of Original Document).

(56) References Cited

OTHER PUBLICATIONS

Office Action, CN App. No. 202010951887.8, Nov. 30, 2023, 14 pages (7 pages of English Translation and 7 pages of Original Document).
Wikipedia, "Sparse Matrix", retrieved from <https://web.archive.org/web/20180312221839/https://en/wikipedia.org/wiki/Sparse_matrix#cite_note-5>, Dec. 29, 2017, 7 pages.
Wikipedia, "Zero-Based Numbering", retrieved from <https://web.archive.org/web/20180124115330/https://en/wikipedia.org/wikiZero-based_numbering>, Dec. 12, 2017, 5 pages.
Extended European Search Report, EP App. No. 25183176.4, Sep. 11, 2025, 8 pages.

502
```
VNNI(C, A, B) {                    // C(mxn), A(M x K), B(K x N)
    for (k in 0 to K) {            // for each flow instance
        for (m in 0 to M) {        // for each of M rows of A
            for(n in 0 to N) {     // for each of N columns of B
                C(m, n) += A(m,k) * B(k,n);
}   }   }   }
```

504
```
VNNI(C, A, B) {                    // C(mxn), A(M x K), B(K x N)
    for ((m, k) in (0,0)-(M,K)) {  // for each element of A at (m, k)
        for (n in 0 to N) {        //  for each column of B in corresponding row
            C(m, n) += A(m,k) * B(k,n);
}   }   }
```

506
```
SDMMVNNI(C, A, B) {                // C(M x N), A(M x K), B(K x N)
    for (each nonzero A(m, k))  {  // Use CSR or CSC to find
        for (n in 0 to N) {        // for each column of B in corresponding row
            C(m, n)[31:0] += A(m,k)[15:0] * B(k,n){15:0];
}   }   }
```

508
```
SDMMVNNI(C, A, B) {                // C(M x N), A(M x K), B(K x N)
    for (each nonzero A(m, k))  {  // Use CSR or CSC to find
        for (n in 0 to N) {        // for each column of B in corresponding row
            C(m, n)[15:0] += A(m,k)[15:0] * B(k,n){15:0];
}   }   }
```

FIG. 5

FIG. 9A
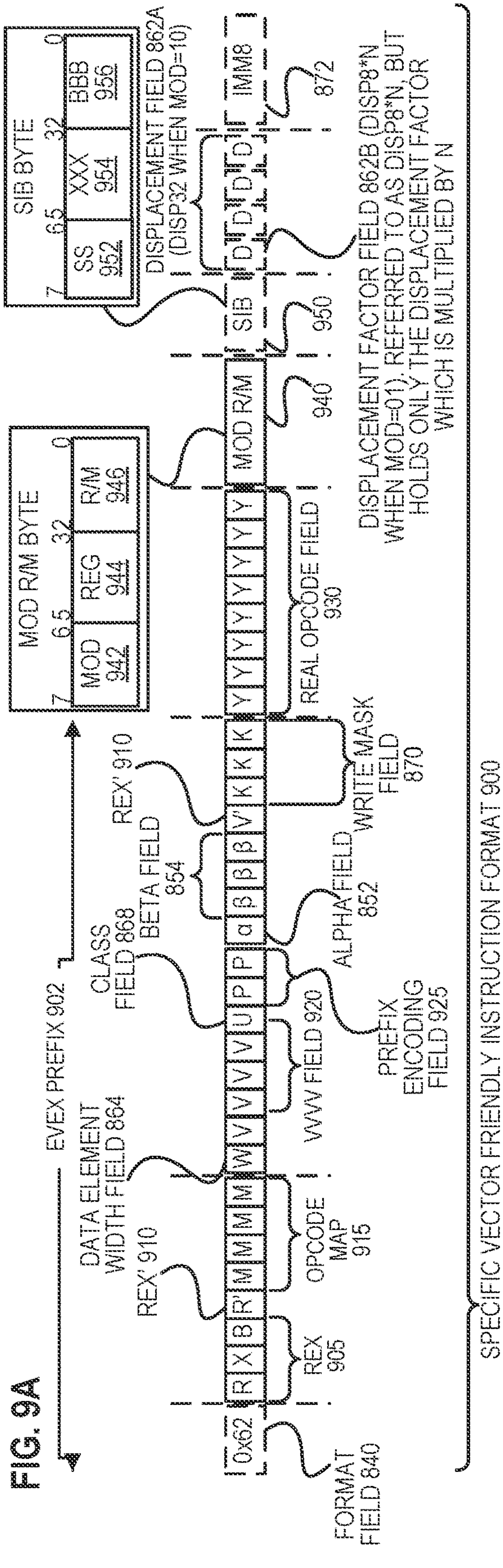
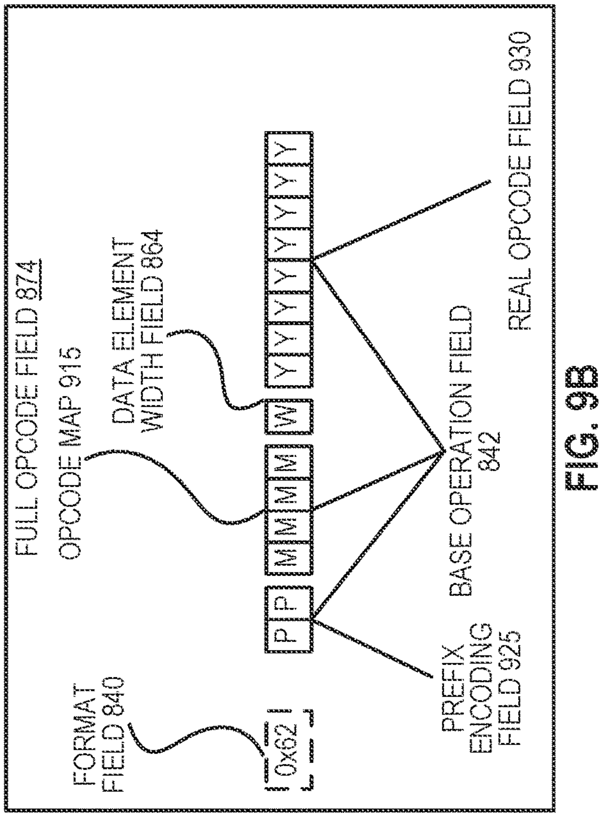
FIG. 9B
FIG. 9C
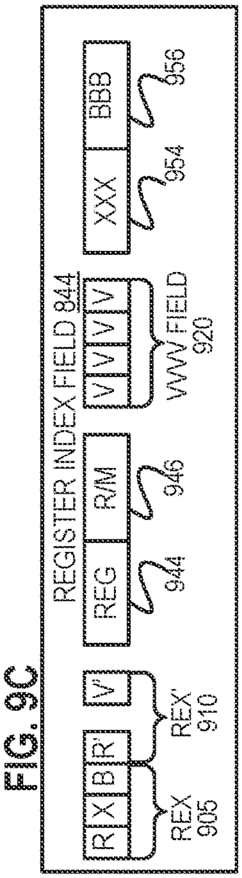

ACCELERATOR FOR SPARSE-DENSE MATRIX MULTIPLICATION

CROSS-REFERENCE TO RELATED APPLICATIONS

This application is a continuation of application Ser. No. 17/229,550, filed Apr. 13, 2021, which is a continuation of application Ser. No. 16/799,586, filed Feb. 24, 2020 (now U.S. Pat. No. 10,984,074 issued Apr. 20, 2021), which is a continuation of application Ser. No. 15/938,924, filed Mar. 28, 2018 (now U.S. Pat. No. 10,572,568 issued Feb. 25, 2020), which are hereby incorporated by reference.

FIELD OF INVENTION

The present disclosure pertains to the field of processing logic, microprocessors, and associated instruction set architectures, and more specifically, to an accelerator for sparse-dense matrix instructions.

BACKGROUND

Deep Learning is a class of machine learning algorithms. Deep learning architectures, such as deep neural networks, have been applied to fields including computer vision, speech recognition, natural language processing, audio recognition, social network filtering, machine translation, bioinformatics and drug design.

Inference and training, two tools used for deep learning, are tending towards low precision arithmetic. Maximizing throughput of deep learning algorithms and computations may assist in meeting the needs of deep learning processors, for example, those performing deep learning in a data center.

Sparse-dense matrix multiplication (SDMM) operations are useful in a deep learning context. But traditional CPU and GPU instruction set architectures require symmetric inputs having the same density, which limits the ability to gain a performance advantage by taking advantage of the sparsity of a sparse input matrix.

BRIEF DESCRIPTION OF THE DRAWINGS

The present invention is illustrated by way of example and not limitation in the figures of the accompanying drawings, in which like references indicate similar elements and in which:

FIG. 5 is pseudocode illustrating execution circuitry to process a sparse-dense matrix multiplication (SDMM) instruction, according to some embodiments;

FIG. 9A is a block diagram illustrating an exemplary specific vector friendly instruction format according to some embodiments;

FIG. 9B is a block diagram illustrating the fields of the specific vector friendly instruction format that make up the full opcode field according to one embodiment of the invention;

FIG. 9C is a block diagram illustrating the fields of the specific vector friendly instruction format that make up the register index field according to one embodiment of the invention;

FIG. 14 shown a block diagram of a system in accordance with one embodiment of the present invention;

FIG. 15 is a block diagram of a first more specific exemplary system in accordance with an embodiment of the present invention.

FIG. 16 is a block diagram of a second more specific exemplary system in accordance with an embodiment of the present invention;

FIG. 17 is a block diagram of a System-on-a-Chip (SoC) in accordance with an embodiment of the present invention.

DETAILED DESCRIPTION

In the following description, numerous specific details are set forth. However, it is understood that some embodiments may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a feature, structure, or characteristic, but every embodiment may not necessarily include the feature, structure, or characteristic. Moreover, such phrases are not necessarily referring to the same embodiment. Further, when a feature, structure, or characteristic is described about an embodiment, it is submitted that it is within the knowledge of one skilled in the art to affect such feature, structure, or characteristic about other embodiments if explicitly described.

Disclosed embodiments maximize execution throughput of a sparse-dense matrix multiplication (SDMM) instruction having variable precision inputs, such as a virtual neural network (VNN) matrix multiplication instruction having one sparse matrix input and one dense matrix input. Using the circuitry disclosed herein, the disclosed SDMM instructions are expected to yield a performance gain over matrix multiplication instructions having symmetric operands.

Disclosed embodiments, by not using a conventional, symmetric matric multiplication circuit, are expected to improve a computer's SDMM instruction throughput by a factor proportional to the sparsity of the sparse input matrix. As used herein, sparsity relates to the proportion of matrix elements having zero or null values. For example, an SDMM instruction operating on a sparse matrix having 0.125 sparsity with only ⅛ of the elements having non-zero values is expected to have an 8-fold increase in throughput. For another example, an SDMM instruction operating on a sparse matrix having 0.05 sparsity with only 1/20 of the elements having non-zero values is expected to have a 20-fold increase in throughput.

In some embodiments, SDMM instructions are executed by execution circuitry having SIMD processing lanes using a grid of fused multiply-add (FMA) circuits. The SIMD lane width can differ in different embodiments. For example, SIMD lane width can include any of 16 elements, 32 elements, 64 elements, and 128 elements, and the elements can be any of 8 bits, 16 bits, 32 bits, 64 bits, and 128 bits, without limitation. SIMD lanes are used to execute an instruction in parallel on multiple data elements.

In some embodiments, multi-bank memories are used for intermediate data and result storage by the multiple SIMD lanes. For example, a SIMD execution circuitry having 8, 64-bit SIMD lanes may use an 8-bank memory.

Figure 1:
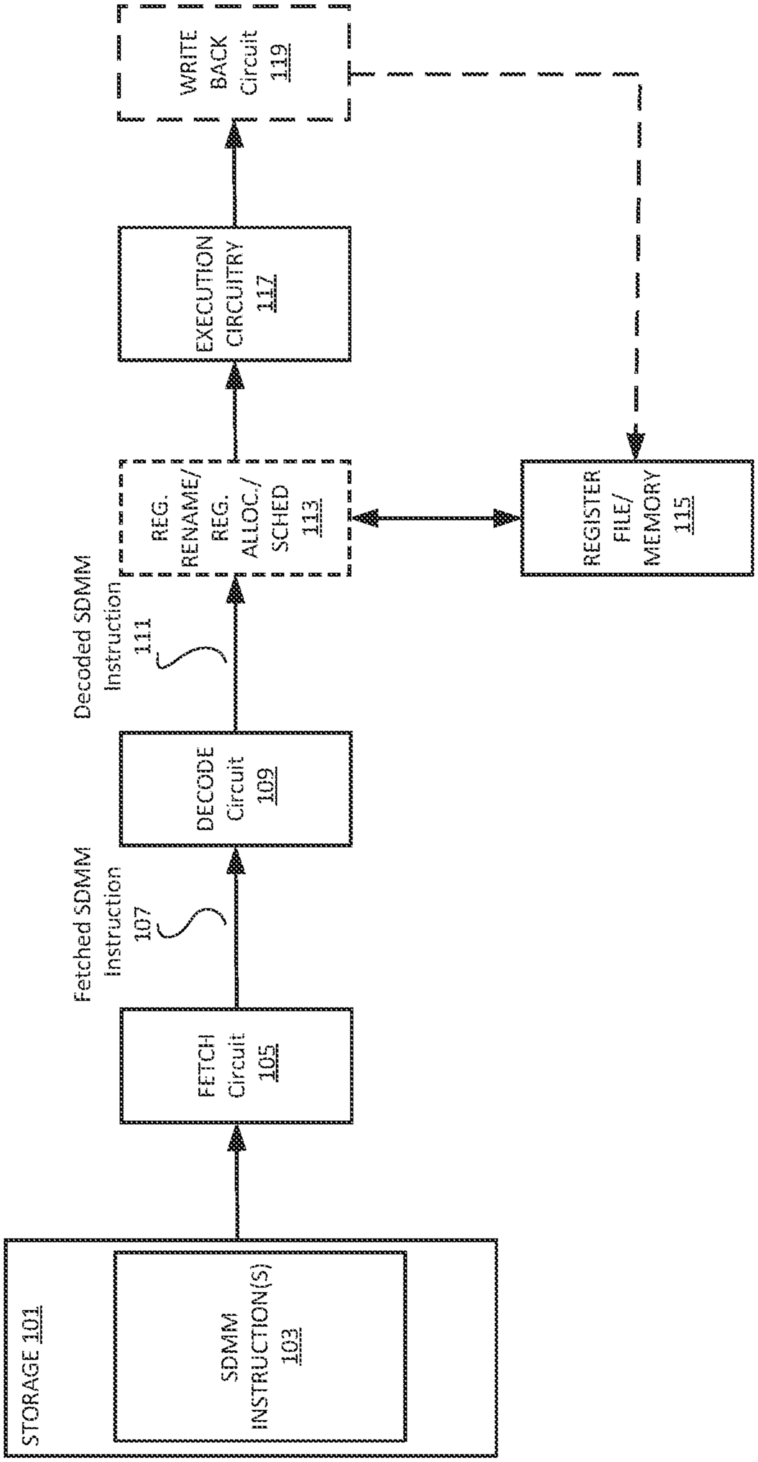
FIG. 1 is a block diagram illustrating processing components for executing a sparse-dense matrix multiplication (SDMM) instruction, such as a sparse-dense multiplication for a virtual neural network instruction (SDMMVNNI), according to some embodiments.

FIG. 1 is a block diagram illustrating processing components for executing a sparse-dense matrix multiplication (SDMM) instruction, such as a sparse-dense multiplication for a virtual neural network instruction (SDMMVNNI), having asymmetric inputs, according to some embodiments. A virtual neural network instruction is applied in a deep learning context and is one type of instruction that can benefit from a sparse-dense matrix multiplication. There are other types of applications that may benefit from a SDMM instruction, such as Galois Field New Instructions (GFNI). Disclosed SDMM instructions are thus not meant to be limited to VNNI instructions. As illustrated, storage 101 stores an SDMM instruction 103 to be executed.

The SDMM instruction 103 is fetched from storage 101 by fetch circuit 105. The fetched SDMM instruction 107 is decoded by decode circuit 109. For example, decode circuit 109 receives the fetched SDMM instruction 107 from fetch circuit 105. The SDMM instruction format, as described further below and with respect to FIGS. 7-9, has fields to specify an opcode, a dense output matrix, a dense source matrix, and a sparse source matrix having a sparsity of non-zero elements being less than one. Decode circuit 109 decodes the fetched SDMM instruction 107 into one or more operations. In some embodiments, this decoding includes generating a plurality of micro-operations to be performed by execution circuitry (such as execution circuitry 117). The decode circuit 109 also decodes instruction suffixes and prefixes (if used). Execution circuitry 117 is further described and illustrated below, including at least respect to FIGS. 2-6 and FIGS. 11-12, below.

In some embodiments, register renaming, register allocation, and/or scheduling circuit 113 provides functionality for one or more of: 1) renaming logical operand values to physical operand values (e.g., a register alias table in some embodiments), 2) allocating status bits and flags to the decoded instruction, and 3) scheduling the decoded SDMM instruction 111 for execution on execution circuitry 117 out of an instruction pool (e.g., using a reservation station in some embodiments).

Registers (register file) and/or memory 115 store data as operands of decoded SDMM instruction 111 to be operated on by execution circuitry 117. Exemplary register types include writemask registers, packed data registers, general purpose registers, and floating point registers, as further described and illustrated below, at least with respect to FIG. 10.

In some embodiments, write back circuit 119 commits the result of the execution of the decoded SDMM instruction 111.

Figure 2A:
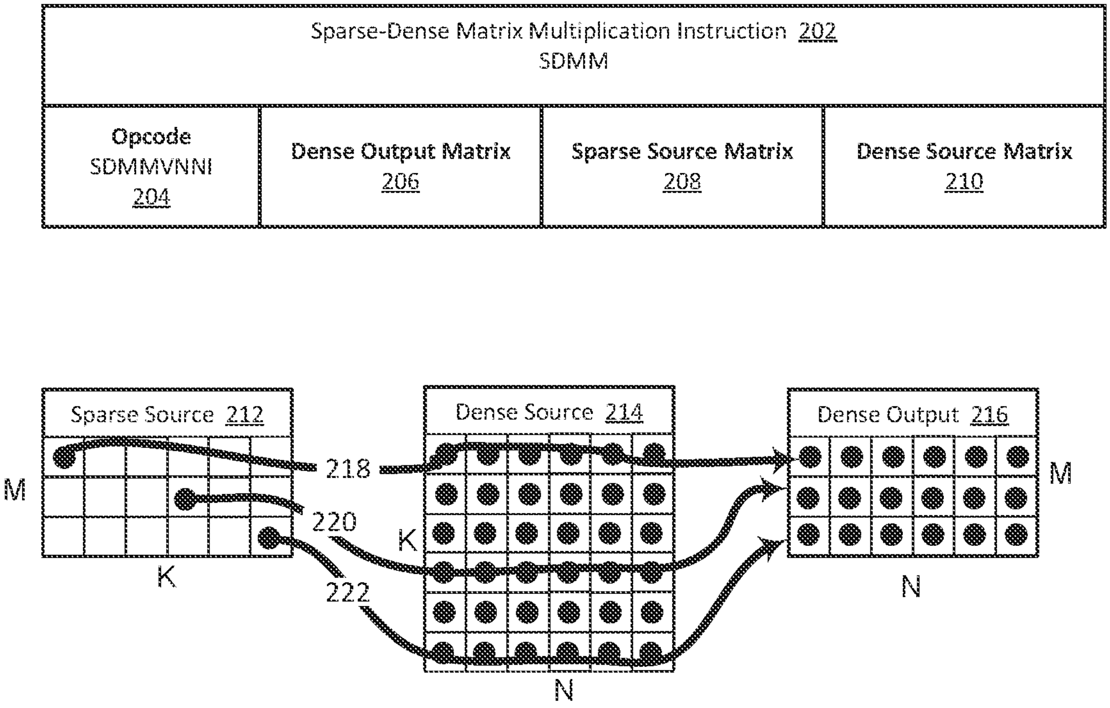
FIG. 2A is a block diagram illustrating a data flow for processing a sparse-dense matrix multiplication (SDMM) instruction, according to some embodiments.

FIG. 2A is a block diagram illustrating a data flow for processing a sparse-dense matrix multiplication (SDMM) instruction, according to some embodiments. As shown, SDMM instruction 202 has fields to specify an opcode 204 (SDMMVNNI), a dense output matrix 206, a dense source matrix 210, and a sparse source matrix 208. As shown, the specified sparse source matrix 212 is logically a M=3 row by K=6-column matrix having a sparsity of non-zero elements being roughly equal to 16.67%. In other words, only 16.67% of the elements of the sparse source matrix have non-zero values. Processing the SDMM instruction 202 according to embodiments disclosed herein improves the throughput of the processor by up to six times, when compared to using a conventional symmetric matrix multiplication circuit. Disclosed embodiments avoid wasting processing cycles on zero-valued elements of the specified sparse source matrix 212. In some embodiments, the sparsity of the specified sparse source matrix 212 is limited to less than 20%. In the context of virtual neural networks, and as shown, the sparse and dense source matrices can represent an activation matrix and a weights vector.

In some embodiments, the specified sparse source matrix 212 is logically a M by K matrix, but only its non-zero elements are stored in memory in a compressed sparse row (CSR) or compressed sparse column (CSC) format, which in some embodiments is prepared in advance. CSC and CSR formats are further described below, at least with reference to FIG. 4.

In some embodiments, SDMM instruction 202 further specifies an element size (here, opcode 204 includes a "W" suffix, specifying Word-sized elements). The format of SDMM instruction is further illustrated and described below, at least with respect to FIGS. 7-9. In some embodiments, one or more of the identified matrices are stored in registers, such as in a register file of a processor, for example as illustrated and discussed below with reference to FIG. 10.

In some embodiments, one or more of the identified matrices are stored in a memory location.

As shown, specified sparse source matrix 212 is a matrix logically having M rows (equal to 3) and K columns (equal to 6), with non-zero elements at (0,0), (3,3), and (2,5). Hence, specified sparse source matrix 212 has a sparsity of around 16.67%, and processing the instruction according to disclosed embodiments provides an up to six-times improvement in processor throughput. Specified dense source matrix 214 has K rows (equal to 6), and N columns (equal to 6). The specified dense output matrix 216 is shown as having M rows and N columns. As described herein, capital letters, M, N, and K, are used to refer to the maximal dimensions of the matrices, whereas lower-case letters, m, n, and k, are used as indices to element positions within the matrices.

In operation, as shown by data flow indictors 218, 220 and 222, for each non-zero element at row m and column k of the specified sparse source matrix 212, execution circuitry generates a product of the non-zero element and all the corresponding dense elements at row k of the specified dense source matrix 214. Execution circuitry then accumulates each generated product with previous values of a corresponding output element at row m of the specified dense output matrix 216. In some embodiments, execution circuitry writes the accumulated sum to the corresponding elements of the specified dense output matrix 216. In some embodiments, execution circuitry writes the accumulated sum to a scratchpad memory (Not shown) before writing to the dense output matrix.

Figure 2B:
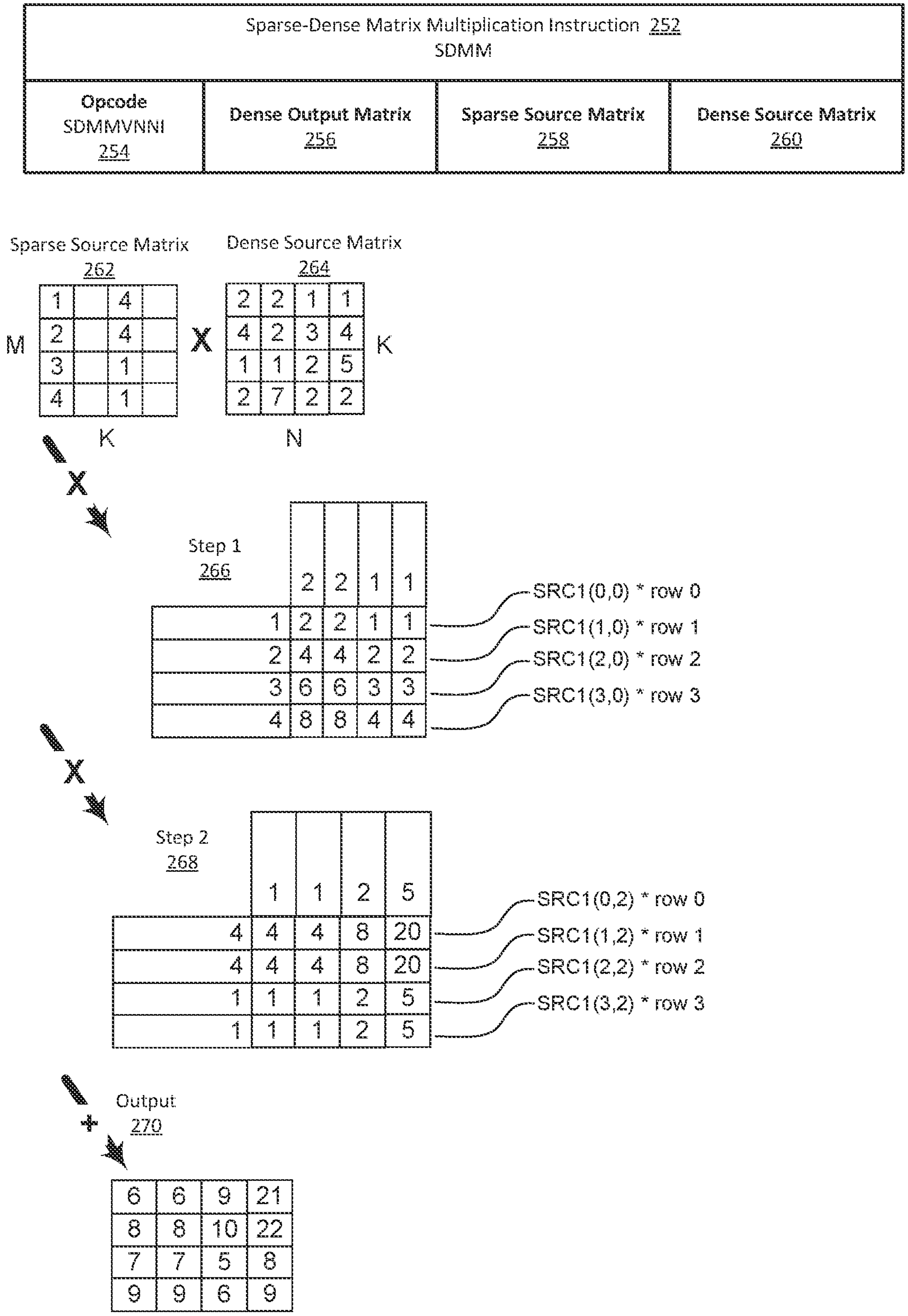
FIG. 2B is a block diagram illustrating a data flow for processing a sparse-dense matrix multiplication (SDMM) instruction, according to some embodiments.

FIG. 2B is a block diagram illustrating a data flow for processing a sparse-dense matrix multiplication (SDMM) instruction, according to some embodiments. As shown, SDMM instruction 252 has fields to specify an opcode 254 (SDMMVNNI), a dense output matrix 256, a dense source matrix 260, and a sparse source matrix 258. The specified sparse source matrix 262 is logically a M=4 by K=4 matrix, with non-zero elements in the first and third columns. Hence, the specified sparse source matrix 262 has a sparsity of 0.5. In other words, 50% of the elements of the specified sparse source matrix 262 have non-zero values. SDMM instruction 252, processed according to embodiments disclosed herein, improves the throughput of the processor by two times, when compared to using a conventional symmetric matrix multiplication circuit. Disclosed embodiments avoid wasting processing cycles on zero-valued source elements. In some embodiments, the sparsity of specified sparse source matrix 262 is limited to less than 10%. In some embodiments, one or more of the identified matrices are stored in registers, such as in a register file of a processor, for example as illustrated and discussed below with reference to FIG. 10. In some embodiments, one or more of the specified sparse source, dense source, and dense output matrices are stored in a memory location.

As shown, Specified sparse source matrix 262 is a matrix logically having M rows (equal to 4) and K columns (equal to 4), with eight non-zero elements at column 0 and column 2. Specified dense source matrix 270 has K rows (equal to 4), and N columns (equal to 4). As described herein, capital letters, M, N, and K, are used to refer to the maximal dimensions of the matrices, whereas lower-case letters, m, n, and k, are used to refer to indices of the element positions within the matrices.

In operation, according to some embodiments, for each non-zero element at row m and column k of specified sparse source matrix 262, execution circuitry generates a product of the non-zero element and each corresponding element at row k and column $\{0, n-1\}$ of Specified dense source matrix 264. In this embodiment, as shown at step 1 266, each of the non-zero elements of the first column of Specified sparse source matrix 262 is multiplied by every element at corresponding first row of Specified dense source matrix 264. As shown at step 2 268, each of the non-zero elements of the third column of the Specified sparse source matrix 262 is multiplied by every element at the corresponding third row of the Specified dense source matrix 264. Then, execution circuitry accumulates the products generated in step 1 266 and step 2 268 with previous values of corresponding output element at row m and column n of Specified dense output matrix 270. For simplicity, here, the previous values of the output matrix are not shown, but are assumed to be zero. In some embodiments, execution circuitry writes the accumulated sums to the corresponding elements of the dense output matrix. In some embodiments, execution circuitry writes the accumulated sum to a scratchpad memory before writing to the dense output matrix.

Figure 3:
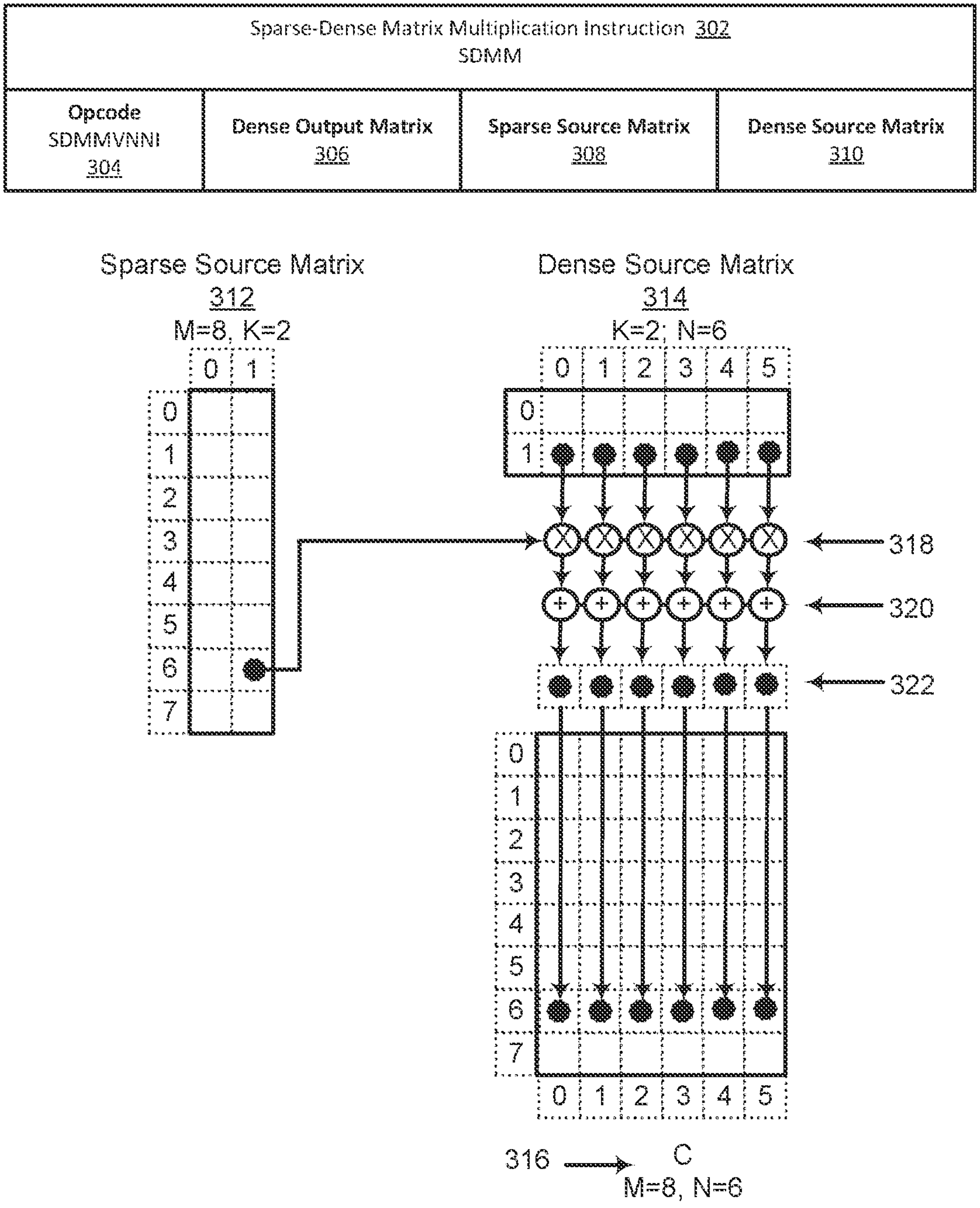
FIG. 3 is a block diagram illustrating execution circuitry to process a sparse-dense matrix multiplication (SDMM) instruction, according to some embodiments.

FIG. 3 is a block diagram illustrating an execution circuit for processing a sparse-dense matrix multiplication (SDMM) instruction, according to some embodiments. As shown, SDMM instruction 302 has fields to specify an opcode 304 (SDMMVNNI), a dense output matrix 306, a sparse source matrix 308, and a dense source matrix 310. As illustrated, specified sparse source matrix 312 has a sparsity of non-zero elements being, for illustration, around 0.07. In other words, around 7% of the elements of the specified sparse source matrix have non-zero values. Processing the SDMM instruction according to embodiments disclosed herein improves the throughput of the processor by roughly 14 times, when compared to using a conventional symmetric matrix multiplication circuit. Disclosed embodiments avoid wasting processing cycles on zero-valued source elements. In some embodiments, the sparsity of the sparse source matrix is limited to less than 10%. In some embodiments, one or more of the identified matrices are stored in registers, such as in a register file of a processor, for example as illustrated and discussed below with reference to FIG. 10. In some embodiments, one or more of the identified matrices are stored in a memory location.

As shown, specified sparse source matrix 312 is a matrix having M rows (equal to 8) and K columns (equal to 2), with one non-zero elements at row 6 and column 1. Specified dense source matrix 314 has K rows (equal to 2), and N columns (equal to 6). The specified dense output matrix 316 is shown as having M rows (equal to 8) and N columns (equal to 6).

In operation, according to some embodiments, for each non-zero element at row m and column k of specified sparse source matrix 312, execution circuitry generates a product of the non-zero element and each corresponding dense element at row k and column n of specified dense source matrix 314. As shown the non-zero element at element (6,1) of specified sparse source matrix 312 is multiplied by every element at corresponding row 1 of specified dense source matrix 314 using multipliers 318. Execution circuitry then generates an accumulated sum of the products generated by multipliers 318 and previous values of the corresponding elements of specified dense output matrix 316 using adders/accumulators 320. Here, the previous values of the output matrix are not shown, but, for simplicity, are assumed to be zero. In some embodiments, execution circuitry writes the accumulated sums to the corresponding elements of specified dense output matrix 316. In some embodiments, execution circuitry writes the accumulated sums to a scratchpad memory 322 before writing to specified dense output matrix 316.

Execution circuitry to execute the SDMM instruction according to disclosed embodiments is further illustrated and discussed at least with respect to FIGS. 4-6, and FIGS. 11-12.

Figure 4:
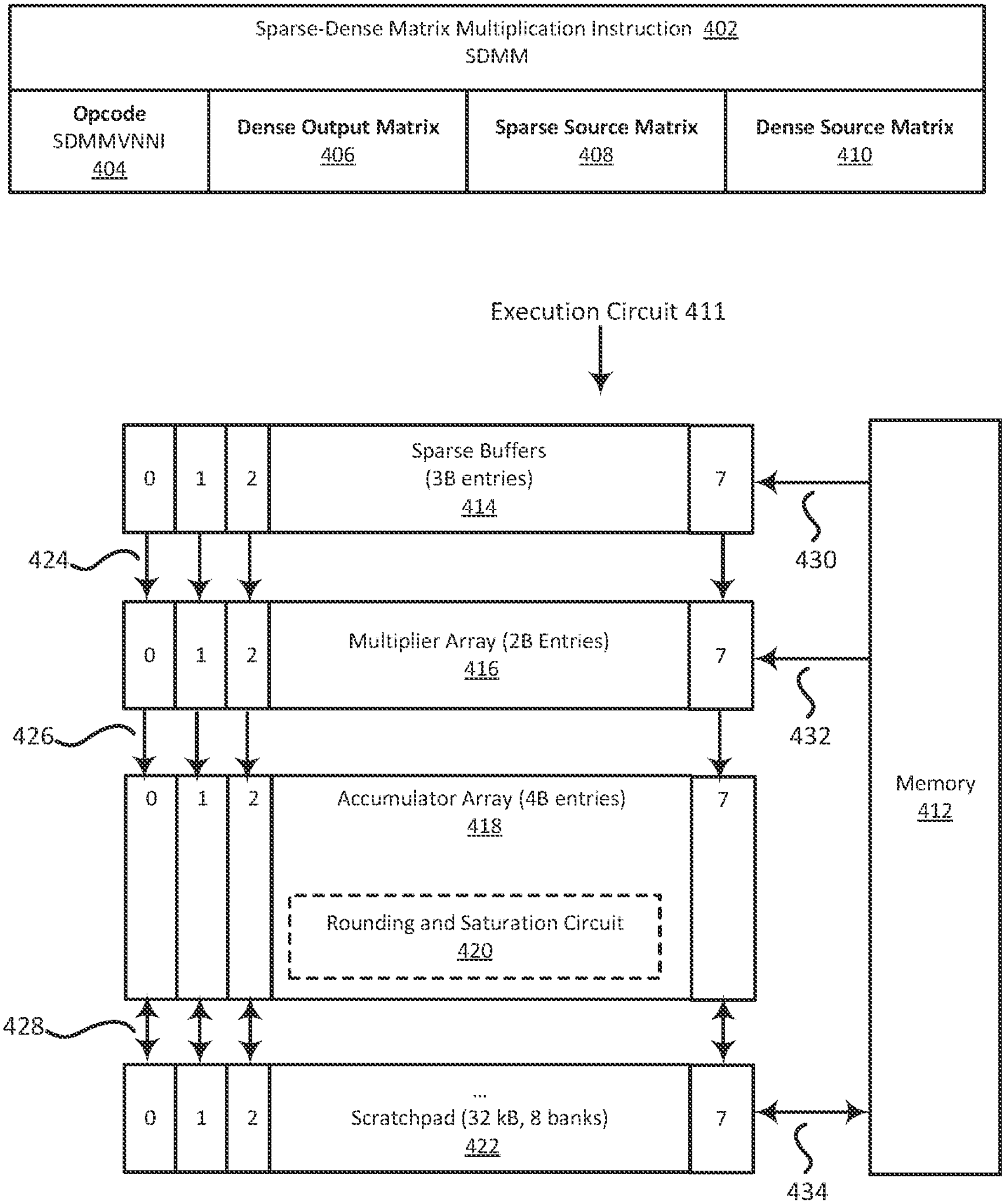
FIG. 4 is a block diagram illustrating execution circuitry to process a sparse-dense matrix multiplication (SDMM) instruction, according to some embodiments.

FIG. 4 is a block diagram illustrating an execution circuit 411 for processing a sparse-dense matrix multiplication (SDMM) instruction, according to some embodiments. As shown, SDMM instruction 402 has fields to specify an opcode 404 (SDMMVNNI), a dense output matrix 406, a sparse source matrix 408, and a dense source matrix 410. In the illustrated embodiment, the specified dense output, dense source, and sparse source matrices have dimensions M=N=256 and K=512 of 2-byte-precision entries and the specified sparse source matrix has a sparsity of 0.125.

Compressed Sparse Row/Compressed Sparse Column Format

In some embodiments, the sparse source matrix is stored in sparse format in memory 412, such that the execution circuit 411 reads the sparsely-formatted matrix via path 430, but only buffers the non-zero values in sparse buffers 414.

To avoid unnecessary memory accesses and to conserve memory space, however, some embodiments store only the non-zero elements of the sparse source matrix in memory 412 in compressed sparse row (CSR) or compressed sparse column (CSC) format. With CSR and CSC formats, only the non-zero elements of the sparse source matrix, organized in row-major format or column-major format, respectively, are stored. In some embodiments, the CSR or CSC-formatted sparse source matrices are prepared in memory 412 in advance of the operation by specialized hardware or software.

Sparse Buffers 414

The specified sparse source matrix in the illustrated embodiment is logically a 256×512 matrix having 32 non-zero elements per column, i.e., at a sparsity of 0.125. The illustrated embodiment uses CSC format to store the sparse source matrix in the sparse buffers 414 and each column of the sparse source sparse matrix is partitioned into 8 banks based on the row index M. In operation, 32 non-zero elements per column of the sparse source matrix are stored in 8 banks of the sparse buffers 414, equally distributed among them in the ideal case. In some embodiments, each of the sparse buffer entries uses up to five bytes, which includes two bytes to store a data value, and up to 3 bytes to specify a matrix position of the element within the specified sparse source matrix. In some embodiments, the specified sparse source matrix logically has M=16 rows and K=16 columns, and the 1-byte matrix position specifies an offset of the element within the 256 elements. In some embodiments, the specified sparse source matrix has M=16 rows and K=16 columns, and the 1-byte matrix position includes a nibble to specify the column and a nibble to specify the row in which the element is located.

Multiplier Array 416

In the illustrated embodiment, the multiplier array is of size 8×32 where the 8 rows of the multiplier array are connected via path 424 to the 8 banks of the sparse buffers 414 providing the 8 multiplier values per cycle needed for multiplication. 32 elements of row k of the dense source matrix which form the multiplicand are broadcasted via path 432 and multiplied across 8 elements of the sparse buffers 414, thus performing 256 multiplications per cycle. The 32-element partial product generated per bank is then routed to accumulator array 418 via path 426, to be accumulated therein. Accumulation results are then written to memory 412 via path 434. In some embodiments, the 32 elements of the dense source matrix are buffered in registers (not shown) before the multiplications. In some embodiments, as shown, the 32 elements are fed into multiplier array 416 as they are loaded from memory 412. In some embodiments, multiplier array 416 comprises a grid of fused-multiply-add (FMA) hardware units.

Accumulator Array 418

As shown, accumulator array 418 includes 256 accumulators divided into 8 banks, each connected to the corresponding bank of sparse buffers 414 and multiplier array 416. In operations, accumulators (32 per bank) in accumulator array 418 accumulate the products generated by multiplier array 416 with previous values of corresponding elements of the dense output matrix specified by the dense output matrix 406 field of SDMM instruction 402.

Rounding and Saturation Circuit 420

In some embodiments, the products generated by multiplier array 416 and accumulated by accumulator array 418 are high-precision intermediate results represented by at least twice as many bits as used by the data elements of the specified matrices. In some embodiments, rounding and saturation circuit 420 saturates the intermediate results to a predefined maximum and rounds them to fit within the number of bits of elements of the dense output matrix specified by the dense output matrix 406 field of the SDMM instruction 402, which here is 16 bits.

In the case of floating point arithmetic, rounding and saturation circuit 420 may round the intermediate results according to the IEEE 754 floating point standard, established in 1985 and updated in 2008 by the Institute of Electrical and Electronics Engineers. The IEEE 754 floating point standard defines rounding rules to be applied, including round to nearest with ties to even, round to nearest with ties away from zero, toward zero, toward positive infinity, and toward negative infinity. In some embodiments, rounding and saturation circuit 420 includes a software-accessible rounding control register (not shown) to specify the rounding rule to apply.

In some embodiments, each of the FMA hardware units in multiplier array 416 performs the rounding by itself. In some embodiments, each of the FMA hardware units in multiplier array 416 checks for saturation and performs the saturating itself.

Scratchpad 422

As shown, execution circuit 411 includes scratchpad 422 to store intermediate execution results. In some embodiments, as here, scratchpad 422 is a 32 kB memory, partitioned into eight (8) banks, each connected one to one with the corresponding row of the multiplier array and bank of the accumulator. In some embodiments, all of the banks of scratchpad 422 communicate via path 428 with corresponding banks of accumulator array 418 in parallel, yielding a high-bandwidth connection. Accumulator array 418 stores accumulation results to memory via path 434. Using the CSC format for multiplication, whereby only non-zero elements of the specified sparse source matrix are stored in sparse buffers 414 and supplied to multiplier array 416 obviates the need to use an expensive gather scatter circuit to gather and supply non-zero data to multiplier array 416 and accumulator array 418.

In some embodiments, as here, execution circuit 411 utilizes one or more single-instruction, multiple data (SIMD) processing lanes, for example, 8 lanes, to perform a same operation on multiple data elements at the same time. In some embodiments, a SIMD processing lane has a lane width of 32 elements, and 8 SIMD processing lanes are used to perform 256 operations on 256 elements of data.

In some embodiments, two or more SIMD processing lanes operate concurrently, and in parallel. The number of lanes in a SIMD processor, as well as the number of elements assigned to each lane, can vary, without limitation. According to some embodiments, a SIMD processing lane is implemented as having a lane width being one 8 elements, 16 elements, or 32 element s, with element widths of 8-bits, 16 bits, 32 bits, or 64-bits, without limitation.

In some embodiments, execution circuit 411 performs the SDMM instruction 402 by performing multiply-accumulate operations using fused multiply-add (FMA) hardware units to generate the products of each non-zero element of the specified sparse source matrix and each of the elements in a corresponding row of the specified dense source matrix, and to accumulate products with the previous values of corresponding elements of the dense output matrix specified by the dense output matrix 406 field of SDMM instruction 402.

As used herein, the term "corresponding" has a different interpretation based on its context. In the context of generating the products, the corresponding elements of the dense source matrix specified by the dense source matrix 410 field that correspond to each non-zero element (m, k) of the sparse source matrix specified by the sparse source matrix 408 field of SDMM instruction 402 are the corresponding elements, (k, n), in a corresponding row, k of the dense source matrix specified by the dense source matrix 410 field of the SDMM instruction 402. In the context of accumulating the products with previous contents of the dense output matrix specified by the dense output matrix 406 field of SDMM instruction 402. The corresponding elements of the specified dense output matrix are those at locations (m, n).

Accordingly, execution circuit 411, by executing an SDMM instruction 402 specifying a sparse source matrix 408 having a sparsity of 0.125, improves the throughput of the processor in which it is incorporated by 8 times, when compared to using a symmetric matrix multiplication circuit.

Execution circuitry to execute the SDMM instruction according to disclosed embodiments is further illustrated and discussed, at least with respect to FIGS. 3-6, and FIGS. 11-12.

FIG. 5 is pseudocode illustrating operation of execution circuitry to process instructions calling for matrix multiplication, here, a virtual neural network instruction (VNNI). For illustrative purposes, pseudocode 502 and 504 illustrate implementation of a VNNI matrix multiplication instruction on symmetric source operands. As described herein, capital letters, M, N, and K, are used to refer to the maximal dimensions of the matrices, whereas lower-case letters, m, n, and k, are used to refer to indices of element positions within the matrices. Pseudocode 502 and pseudocode 504 both illustrate executing a VNNI instruction on a M-row by K-column (M×K) source matrix A and a K-row by N-column (K×N) source matrix B to generate results of a M-row by N-column (M×N) output matrix C. Pseudocodes 506 and 508, on the other hand, illustrate executing the SDMM instruction according to disclosed embodiments, wherein only the non-zero elements of sparse source matrix A are processed, thereby increasing processor throughput in proportion to the sparsity of source matrix A.

Execution circuitry to execute the SDMM instruction according to disclosed embodiments is illustrated and discussed at least with respect to FIGS. 3-6, and FIGS. 11-12.

Figure 6:
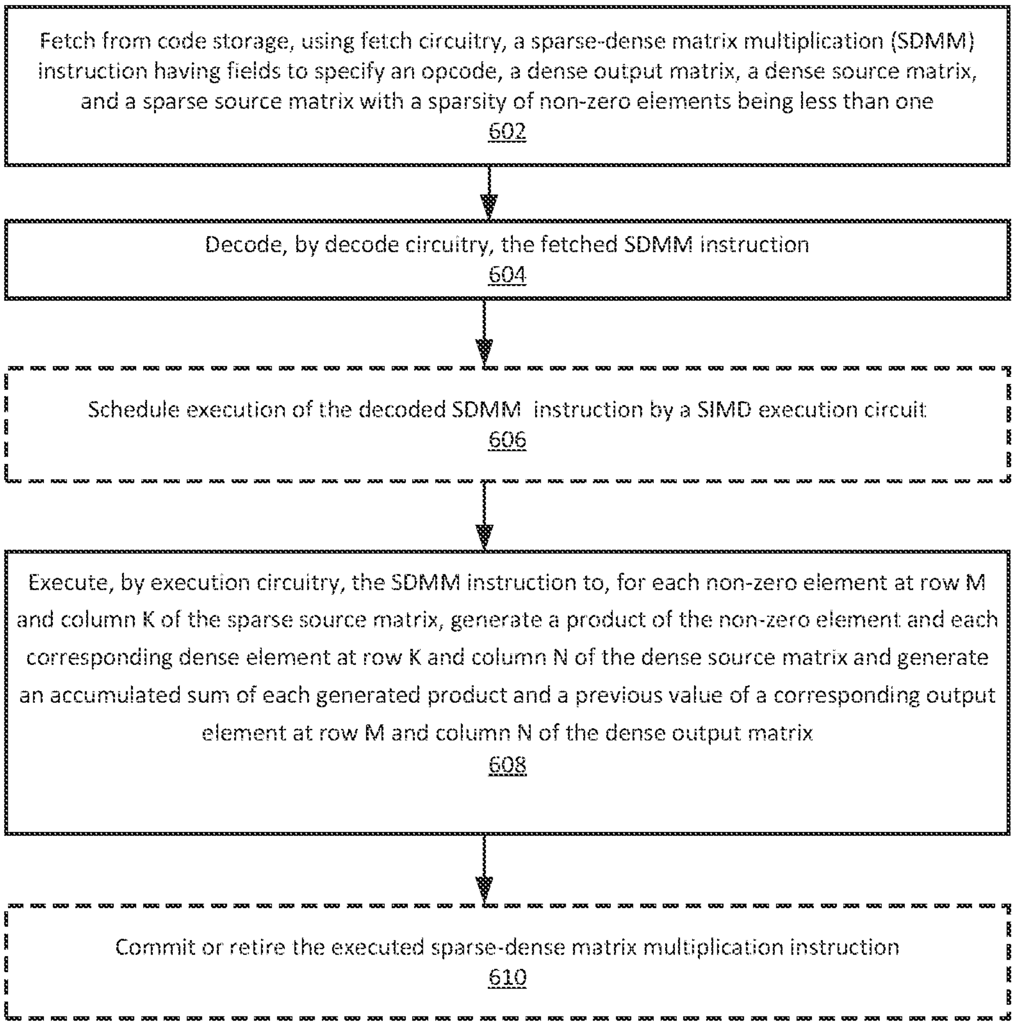
FIG. 6 is a process flow diagram illustrating execution of a sparse-dense matrix multiplication (SDMM) instruction by a processor, according to some embodiments.

FIG. 6 is a process flow diagram illustrating execution of a sparse-dense matrix multiplication (SDMM) instruction by a processor, according to some embodiments. At 602, the processor fetches, from code storage using fetch circuitry, the sparse-dense matrix multiplication instruction having fields to specify an opcode, a dense output matrix, a dense source matrix, and a sparse source matrix having a sparsity of non-zero elements, the sparsity being less than one. The SDMM instruction fetched at 602 may be referred to as an asymmetric SDMM instruction, insofar as one source is a sparse matrix and the other source is a dense matrix. At 604, the processor decodes, by decode circuitry, the fetched SDMM instruction. At 606, the processor optionally schedules execution of the decoded SDMM instruction by a SIMD execution circuit. Operation 606 is optional, as indicated by its dashed border, insofar as scheduling execution of the decoded instruction may occur at a different time, or not at all. At 608, the processor executes, by execution circuitry, the decoded SDMM instruction to, for each non-zero element at row M and column K of the sparse source matrix, generate a product of the non-zero element and each corresponding dense element at row K and column N of the dense source matrix; and accumulates each generated product with a previous value of a corresponding output element at row M and column N of the dense output matrix. At 610, the processor optionally commits or retires the executed SDMM instruction. Operation 610 is optional, as indicated by its dashed border, insofar as it may occur at a different time, or not at all.

Execution circuitry to execute the SDMM instruction according to disclosed embodiments is illustrated and discussed at least with respect to FIGS. 3-6, and FIGS. 11-12.

Figure 7:
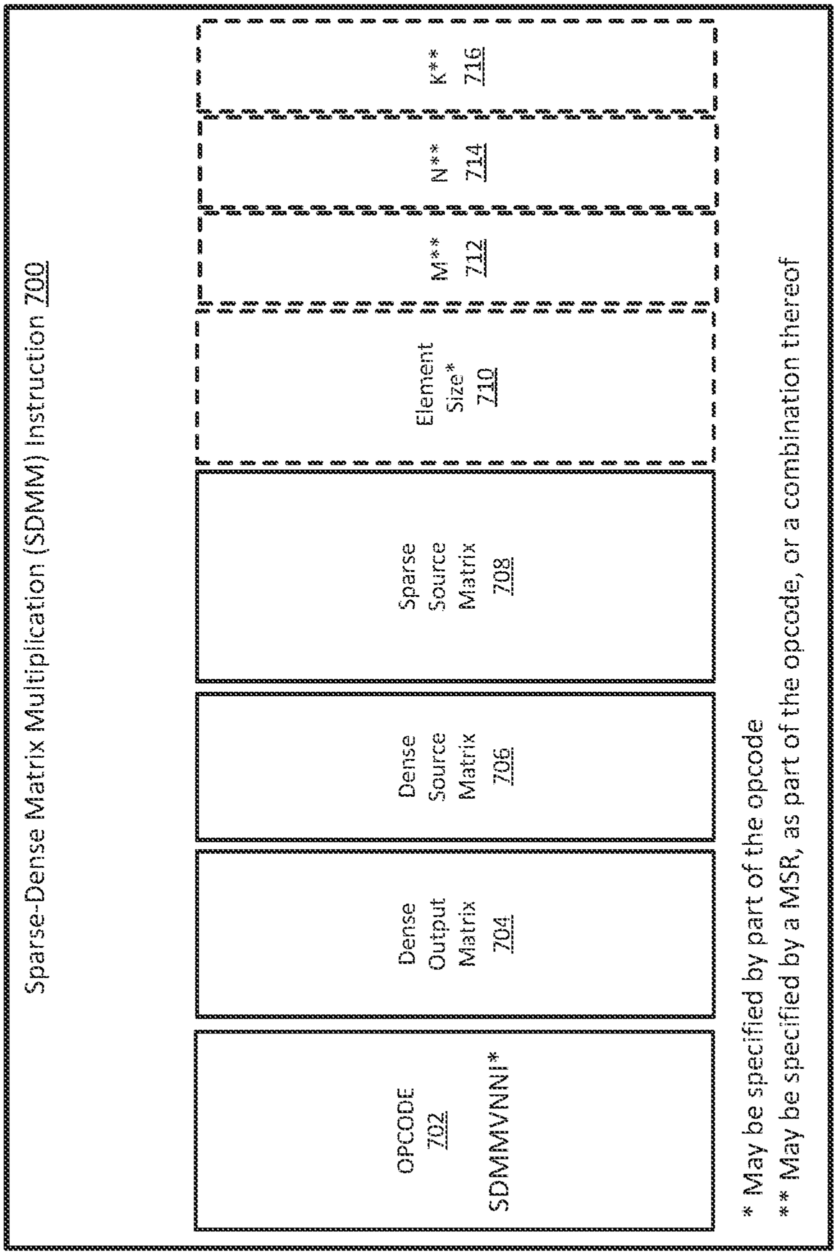
FIG. 7 is a block diagram illustrating a format of a sparse-dense matrix multiplication (SDMM) instruction, according to some embodiments.

FIG. 7 is an exemplary format of a sparse-dense matrix multiplication (SDMM) instruction, according to some embodiments. As shown, SDMM instruction 700 includes opcode 702 (SDMMVNNI*), and fields to specify a dense output matrix 704, dense source matrix 706, and sparse source matrix 708. SDMM instruction 700 further includes optional fields to specify element size 710, and M, N, and K dimensions, 712, 714, and 716. In some embodiments, one or more of optional dimensions 712, 714, and 716 is specified by a software programmable model specific register (MSR), which may be a predetermined MSR. As shown in FIG. 7, the optional element size 710 may be specified by part of the opcode, and the M, N, and K dimensions, 712, 714, and 716 may be specified by a MSR, as part of the opcode, or a combination thereof. Opcode 702 is shown as including an asterisk to indicate that it may optionally include additional prefixes or suffixes to specify instruction behaviors. For example, opcode 702 may include a suffix, such as "B," "W," "D," or "Q," to specify an element size of eight, sixteen, thirty-two, and sixty-four bits, respectively. If the SDMM instruction 700 does not specify any of the optional parameters, predetermined default values are used. The format of the SDMM instruction is further illustrated and described below with respect to FIG. 8A, FIG. 8B, and FIGS. 9A-D.

Prepping the Compressed Sparse Source Matrix Ahead-of-Time

Referring again to FIG. 2B, the specified compressed sparse source matrix (CSR or CSC) in some embodiments is prepared in advance. CSC and CSR formats are further illustrated and described, at least with reference to FIG. 4.

In some embodiments, SDMM instruction 700 is used to cause the processor to prepare a sparse source matrix in compressed format (either CSR, or CSC, as further illustrated and described with respect to FIG. 4). In some embodiments, opcode 702 may include a prefix or a suffix, such as "PREP," to instruct the processor to prepare a compressed sparse source matrix. In such embodiments, the dense output matrix 704 field specifies a memory address at which to store the compressed sparse source matrix, and sparse source matrix 708 specifies a memory location at which a sparse data set is stored, the sparse data set comprising a large block of memory having a sparsity of valid elements, the validity being determined by the data values themselves (e.g., invalid being null, zero, or below a threshold value), or by a control field appended to and indicating validity of each element. The size of the sparse data set is specified in such embodiments by the dense source matrix 706 field.

In one example, SDMM instruction 700 includes an opcode 702 having a "PREP" suffix, specifies a dense output matrix 704 where to store the condensed sparse source matrix, uses the sparse source matrix 708 field to specify where a sparse data set comprising tens, hundreds, thousands, millions, or billions of data elements, with invalid elements having null values, and uses the dense source matrix 706 field to specify a size of the sparse data set. In response, the processor loads the data elements from the specified sparse source matrix 708 location, uses the dense source matrix 706 field to determine the size of the sparse data set, determines whether each data element is valid, and writes the valid elements, in compressed format (CSR or CSC) to the specified dense output matrix 704 location, which in some embodiments is a cache-line-aligned location. The processor thus packs the valid elements of the sparse data set in compressed format (CSR or CSC) to the specified output matrix, which can serve as a sparse source matrix for a subsequent SDMM instruction.

In another example, SDMM instruction 700 includes an opcode 702 having a "PREP" suffix, specifies a dense output matrix 704 where to store the condensed sparse source matrix, uses the sparse source matrix 708 field to specify where a sparse data set comprising tens, hundreds, thousands, millions, or billions of data elements, with each element including a control fields including at least a valid bit, and uses the dense source matrix 706 field to specify a size (i.e., number of elements) of the sparse data set. In response, the processor loads the data elements from the specified sparse source matrix 708 location, uses the dense source matrix 706 field to determine the size of the sparse data set, determines whether each data element is valid, and writes the valid elements, in compressed format (CSR or CSC) to the specified dense output matrix 704 location, which in some embodiments is a cache-line-aligned location. The processor thus packs the valid elements of the sparse data set in compressed format (CSR or CSC) to the specified output matrix, which can serve as a sparse source matrix for a subsequent SDMM instruction.

In some embodiments, a processor responding to an instance of SDMM instruction 700 having an opcode with a "PREP" suffix operates in the background by opportunistically scheduling execution of its requisite loads and stores only when a processor activity level is below a threshold value. In some embodiments, a processor responding to an instance of SDMM instruction 700 having an opcode with a "PREP" suffix generates an interrupt upon completion of compressing the specified sparse data set.

Instruction Sets

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in each one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 8A:
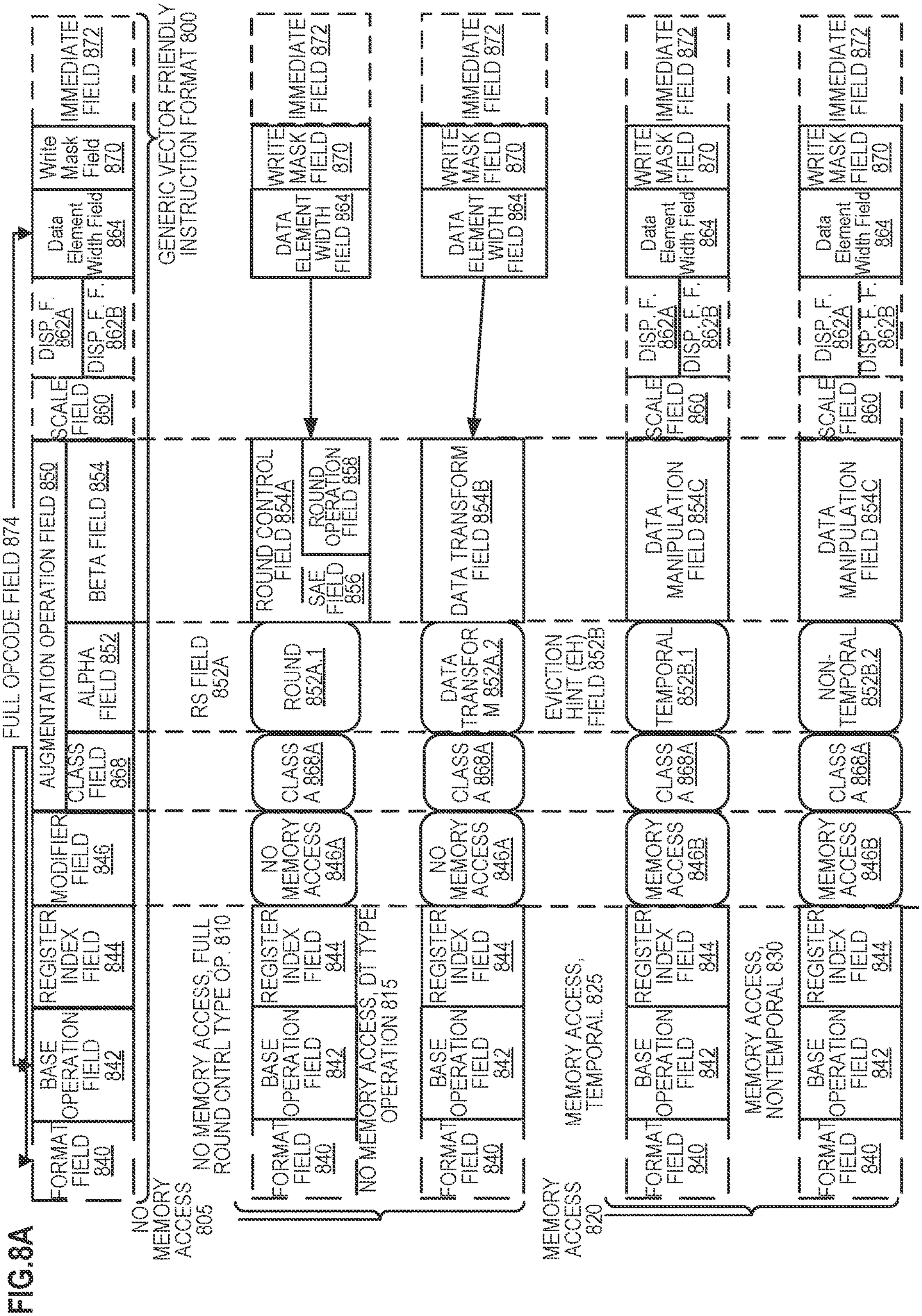
FIG. 8A is a block diagram illustrating a generic vector friendly instruction format and class A instruction templates thereof according to some embodiments.
Figure 8B:
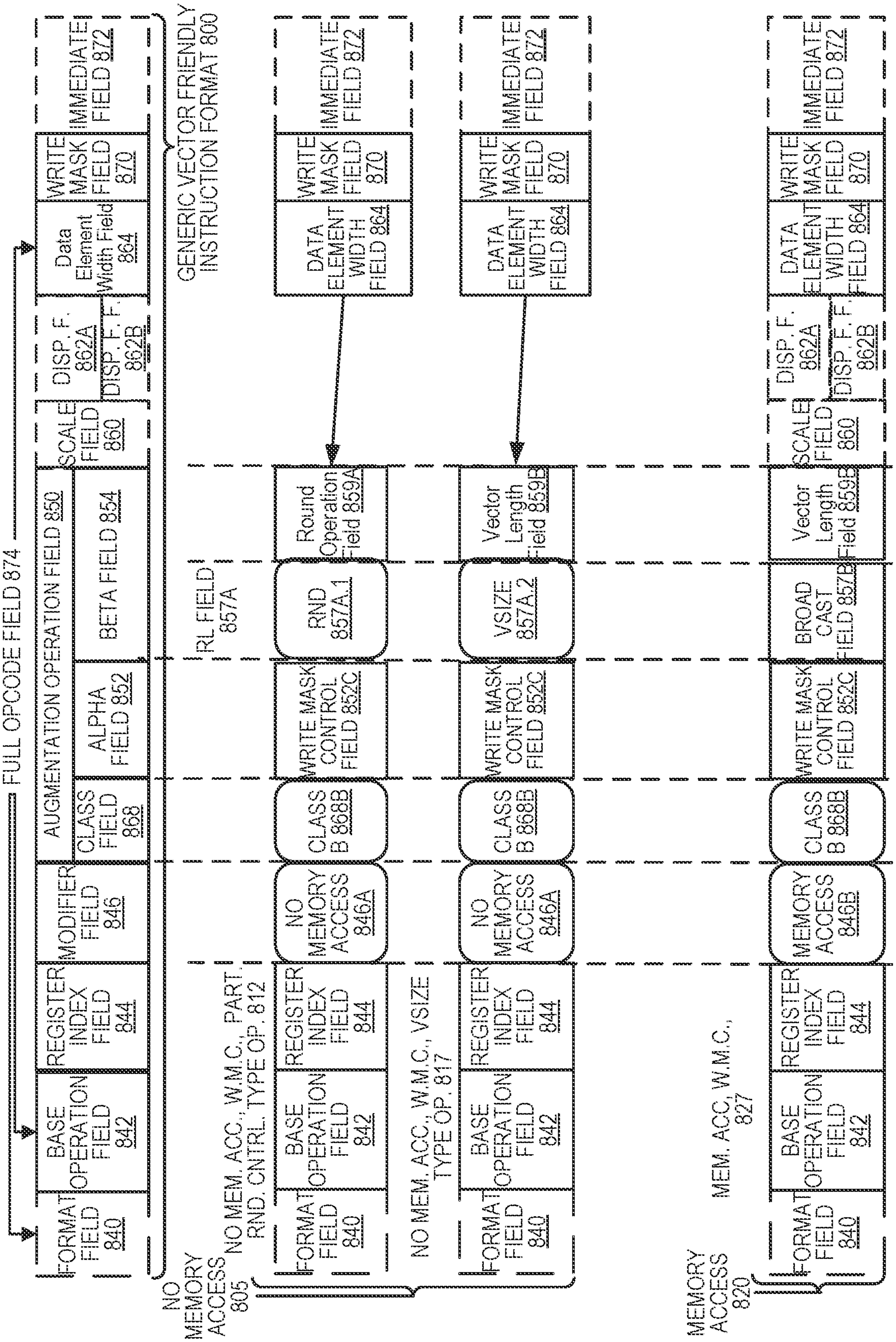
FIG. 8B is a block diagram illustrating the generic vector friendly instruction format and class B instruction templates thereof according to some embodiments.

FIGS. 8A-8B are block diagrams illustrating a generic vector friendly instruction format and instruction templates thereof according to some embodiments. FIG. 8A is a block diagram illustrating a generic vector friendly instruction format and class A instruction templates thereof according to some embodiments; while FIG. 8B is a block diagram illustrating the generic vector friendly instruction format and class B instruction templates thereof according to some embodiments. Specifically, a generic vector friendly instruction format 800 for which are defined class A and class B instruction templates, both of which include no memory access 805 instruction templates and memory access 820 instruction templates. The term generic in the context of the vector friendly instruction format refers to the instruction format not being tied to any specific instruction set.

While some embodiments will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 8A include: 1) within the no memory access 805 instruction templates there is shown a no memory access, full round control type operation 810 instruction template and a no memory access, data transform type operation 815 instruction template; and 2) within the memory access 820 instruction templates there is shown a memory access, temporal 825 instruction template and a memory access, non-temporal 830 instruction template. The class B instruction templates in FIG. 8B include: 1) within the no memory access 805 instruction templates there is shown a no memory access, write mask control, partial round control type operation 812 instruction template and a no memory access, write mask control, vsize type operation 817 instruction template; and 2) within the memory access 820 instruction templates there is shown a memory access, write mask control 827 instruction template.

The generic vector friendly instruction format 800 includes the following fields listed below in the order illustrated in FIGS. 8A-8B.

Format field 840—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 842—its content distinguishes different base operations.

Register index field 844—its content, directly or through address generation, specifies the locations of the source and destination operands, be they in registers or in memory. These include enough bits to select N registers from a P×Q (e.g. 32×512, 16×128, 32×1024, 64×1024) register file. While in one embodiment N may be up to three sources and one destination register, alternative embodiments may support sources and destination registers (e.g., may support up to two sources where one of these sources also acts as the destination, may support up to three sources where one of these sources also acts as the destination, may support up to two sources and one destination).

Modifier field 846—its content distinguishes occurrences of instructions in the generic vector instruction format that specify memory access from those that do not; that is, between no memory access 805 instruction templates and memory access 820 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 850—its content distinguishes which one of a variety of different operations to be performed in addition to the base operation. This field is context specific. In one embodiment of the invention, this field is divided into a class field 868, an alpha field 852, and a beta field 854. The augmentation operation field 850 allows common groups of operations to be performed in a single instruction rather than 2, 3, or 4 instructions.

Scale field 860—its content allows for the scaling of the index field's content for memory address generation (e.g., for address generation that uses $2^{scale}$*index+base).

Displacement Field 862A—its content is used as part of memory address generation (e.g., for address generation that uses $2^{scale}$*index+base+displacement).

Displacement Factor Field 862B (note that the juxtaposition of displacement field 862A directly over displacement factor field 862B indicates one or the other is used)—its content is used as part of address generation; it specifies a displacement factor that is to be scaled by the size of a memory access (N)—where N is the number of bytes in the memory access (e.g., for address generation that uses $2^{scale}$*index+base+scaled displacement). Redundant low-order bits are ignored and hence, the displacement factor field's content is multiplied by the memory operands total size (N) to generate the final displacement to be used in calculating an effective address. The value of N is determined by the processor hardware at runtime based on the full opcode field 874 (described later herein) and the data manipulation field 854C. The displacement field 862A and the displacement factor field 862B are optional in the sense that they are not used for the no memory access 805 instruction templates and/or different embodiments may implement only one or none of the two.

Data element width field 864—its content distinguishes which one of many data element widths is to be used (in some embodiments for all instructions; in other embodiments for only some of the instructions). This field is optional in the sense that it is not needed if only one data element width is supported and/or data element widths are supported using some aspect of the opcodes.

Write mask field 870—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 870 allows for partial vector operations, including loads, stores, arithmetic, logical, etc. While some embodiments are described in which the write mask field's 870 content selects one of many write mask registers that contains the write mask to be used (and thus the write mask field's 870 content indirectly identifies that masking to be performed), alternative embodiments instead or additional allow the mask write field's 870 content to directly specify the masking to be performed.

Immediate field 872—its content allows for the specification of an immediate. This field is optional in the sense that is it not present in an implementation of the generic vector friendly format that does not support immediate and it is not present in instructions that do not use an immediate.

Class field 868—its content distinguishes between different classes of instructions. With reference to FIGS. 8A-B, the contents of this field select between class A and class B instructions. In FIGS. 8A-B, rounded corner squares are used to indicate a specific value is present in a field (e.g., class A 868A and class B 868B for the class field 868 respectively in FIGS. 8A-B).

Instruction Templates of Class A

In the case of the non-memory access 805 instruction templates of class A, the alpha field 852 is interpreted as an RS field 852A, whose content distinguishes which one of the different augmentation operation types are to be performed (e.g., round 852A.1 and data transform 852A.2 are respectively specified for the no memory access, round type operation 810 and the no memory access, data transform type operation 815 instruction templates), while the beta field 854 distinguishes which of the operations of the specified type is to be performed. In the no memory access 805 instruction templates, the scale field 860, the displacement field 862A, and the displacement scale filed 862B are not present.

No-Memory Access Instruction Templates—Full Round Control Type Operation

In the no memory access full round control type operation 810 instruction template, the beta field 854 is interpreted as a round control field 854A, whose content(s) provide static rounding. While in the described embodiments the round control field 854A includes a suppress all floating point exceptions (SAE) field 856 and a round operation control field 858, alternative embodiments may support may encode both these concepts into the same field or only have one or the other of these concepts/fields (e.g., may have only the round operation control field 858).

SAE field 856—its content distinguishes if to disable the exception event reporting; when the SAE field's 856 content indicates suppression is enabled, a given instruction does not report any kind of floating-point exception flag and does not raise any floating point exception handler.

Round operation control field 858—its content distinguishes which one of a group of rounding operations to perform (e.g., Round-up, Round-down, Round-towards-zero and Round-to-nearest). Thus, the round operation control field 858 allows for the changing of the rounding mode on a per instruction basis. In one embodiment of the invention where a processor includes a control register for specifying rounding modes, the round operation control field's 850 content overrides that register value.

No Memory Access Instruction Templates—Data Transform Type Operation

In the no memory access data transform type operation 815 instruction template, the beta field 854 is interpreted as a data transform field 854B, whose content distinguishes which one of many data transforms is to be performed (e.g., no data transform, swizzle, broadcast).

In the case of a memory access 820 instruction template of class A, the alpha field 852 is interpreted as an eviction hint field 852B, whose content distinguishes which one of the eviction hints is to be used (in FIG. 8A, temporal 852B.1 and non-temporal 852B.2 are respectively specified for the memory access, temporal 825 instruction template and the memory access, non-temporal 830 instruction template), while the beta field 854 is interpreted as a data manipulation field 854C, whose content distinguishes which one of a number of data manipulation operations (also known as primitives) is to be performed (e.g., no manipulation; broadcast; up conversion of a source; and down conversion of a destination). The memory access 820 instruction templates include the scale field 860, and optionally the displacement field 862A or the displacement scale field 862B.

Vector memory instructions perform vector loads from and vector stores to memory, with conversion support. As with regular vector instructions, vector memory instructions transfer data from/to memory in a data element-wise fashion, with the elements that are transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 852 is interpreted as a write mask control (Z) field 852C, whose content distinguishes whether the write masking controlled by the write mask field 870 should be a merging or a zeroing.

In the case of the non-memory access 805 instruction templates of class B, part of the beta field 854 is interpreted as an RL field 857A, whose content distinguishes which one of the different augmentation operation types are to be performed (e.g., round 857A.1 and vector length (VSIZE) 857A.2 are respectively specified for the no memory access, write mask control, partial round control type operation 812 instruction template and the no memory access, write mask control, VSIZE type operation 817 instruction template), while the rest of the beta field 854 distinguishes which of the operations of the specified type is to be performed. In the no memory access 805 instruction templates, the scale field 860, the displacement field 862A, and the displacement scale filed 862B are not present.

In the no memory access, write mask control, partial round control type operation 810 instruction template, the rest of the beta field 854 is interpreted as a round operation field 859A and exception event reporting is disabled (a given instruction does not report any kind of floating-point exception flag and does not raise any floating point exception handler).

Round operation control field 859A—just as round operation control field 858, its content distinguishes which one of a group of rounding operations to perform (e.g., Round-up, Round-down, Round-towards-zero and Round-to-nearest). Thus, the round operation control field 859A allows for the changing of the rounding mode on a per instruction basis. In one embodiment of the invention where a processor includes a control register for specifying rounding modes, the round operation control field's 850 content overrides that register value.

In the no memory access, write mask control, VSIZE type operation 817 instruction template, the rest of the beta field 854 is interpreted as a vector length field 859B, whose content distinguishes which one of many data vector lengths is to be performed on (e.g., 128, 256, or 512 byte).

In the case of a memory access 820 instruction template of class B, part of the beta field 854 is interpreted as a broadcast field 857B, whose content distinguishes if the broadcast type data manipulation operation is to be performed, while the rest of the beta field 854 is interpreted the vector length field 859B. The memory access 820 instruction templates include the scale field 860, and optionally the displacement field 862A or the displacement scale field 862B.

About the generic vector friendly instruction format 800, a full opcode field 874 is shown including the format field 840, the base operation field 842, and the data element width field 864. While one embodiment is shown where the full opcode field 874 includes these fields, the full opcode field 874 includes less than these fields in embodiments that do not support all of them. The full opcode field 874 provides the operation code (opcode).

The augmentation operation field 850, the data element width field 864, and the write mask field 870 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 9A is a block diagram illustrating an exemplary specific vector friendly instruction format according to some embodiments. FIG. 9A shows a specific vector friendly instruction format 900 that is specific in the sense that it specifies the location, size, interpretation, and order of the fields, as well as values for some of those fields. The specific vector friendly instruction format 900 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 8 into which the fields from FIG. 9A map are illustrated.

It should be understood that, although some embodiments are described with reference to the specific vector friendly instruction format 900 in the context of the generic vector friendly instruction format 800 for illustrative purposes, the invention is not limited to the specific vector friendly instruction format 900 except where claimed. For example, the generic vector friendly instruction format 800 contemplates a variety of possible sizes for the various fields, while the specific vector friendly instruction format 900 is shown as having fields of specific sizes. By way of specific example, while the data element width field 864 is illustrated as a one bit field in the specific vector friendly instruction format 900, the invention is not so limited (that is, the generic vector friendly instruction format 800 contemplates other sizes of the data element width field 864).

The generic vector friendly instruction format 800 includes the following fields listed below in the order illustrated in FIG. 9A.

EVEX Prefix (Bytes 0-3) 902—is encoded in a four-byte form.

Format Field 840 (EVEX Byte 0, bits [7:0])—the first byte (EVEX Byte 0) is the format field 840 and it contains 0x62 (the unique value used for distinguishing the vector friendly instruction format in one embodiment of the invention).

The second-fourth bytes (EVEX Bytes 1-3) include a number of bit fields providing specific capability.

REX field 905 (EVEX Byte 1, bits [7-5])—consists of a EVEX.R bit field (EVEX Byte 1, bit [7]—R), EVEX.X bit field (EVEX byte 1, bit [6]—X), and 857BEX byte 1, bit[5]—B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 810—this is the first part of the REX' field 810 and is the EVEX.R' bit field (EVEX Byte 1, bit [4]—R') that is used to encode either the upper 16 or lower 16 of the extended 32 register set. In one embodiment of the invention, this bit, along with others as indicated below, is stored in bit inverted format to distinguish (in the well-known x86 32bit mode) from the BOUND instruction, whose real opcode byte is 62, but does not accept in the MOD R/M field (described below) the value of 11 in the MOD field; alternative some embodiments do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 915 (EVEX byte 1, bits [3:0]—mmmm)—its content encodes an implied leading opcode byte (0F, 0F 38, or 0F 3).

Data element width field 864 (EVEX byte 2, bit [7]—W)—is represented by the notation EVEX.W. EVEX.W is used to define the granularity (size) of the datatype (either 32-bit data elements or 64-bit data elements).

EVEX.vvvv 920 (EVEX Byte 2, bits [6:3]—vvvv)—the role of EVEX.vvvv may include the following: 1)

EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 920 encodes the 4 low-order bits of the first source register specifier stored in inverted (1s complement) form. Depending on the instruction, an extra different EVEX bit field is used to extend the specifier size to 32 registers.

EVEX.U 868 Class field (EVEX byte 2, bit [2]—U)—If EVEX.U=0, it indicates class A or EVEX.U0; if EVEX.U=1, it indicates class B or EVEX.U1.

Prefix encoding field 925 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 852 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 854 (EVEX byte 3, bits [6:4]—SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 810—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 870 (EVEX byte 3, bits [2:0]—kkk)—its content specifies the index of a register in the write mask registers as previously described. In one embodiment of the invention, the specific value EVEX kkk=000 has a special behavior implying no write mask is used for the particular instruction (this may be implemented in a variety of ways including the use of a write mask hardwired to all ones or hardware that bypasses the masking hardware).

Real Opcode Field 930 (Byte 4) is also known as the opcode byte. Part of the opcode is specified in this field.

MOD R/M Field 940 (Byte 5) includes MOD field 942, Reg field 944, and R/M field 946. As previously described, the MOD field's 942 content distinguishes between memory access and non-memory access operations. The role of Reg field 944 can be summarized to two situations: encoding either the destination register operand or a source register operand, or be treated as an opcode extension and not used to encode any instruction operand. The role of R/M field 946 may include the following: encoding the instruction operand that references a memory address, or encoding either the destination register operand or a source register operand.

Scale, Index, Base (SIB) Byte (Byte 6)—As previously described, the scale field's 850 content is used for memory address generation. SIB.xxx 954 and SIB.bbb 956—the contents of these fields have been previously referred to with regard to the register indexes Xxxx and Bbbb.

Displacement field 862A (Bytes 7-10)—when MOD field 942 contains 10, bytes 7-10 are the displacement field 862A, and it works the same as the legacy 32-bit displacement (disp32) and works at byte granularity.

Displacement factor field 862B (Byte 7)—when MOD field 942 contains 01, byte 7 is the displacement factor field 862B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 862B is a reinterpretation of disp8; when using displacement factor field 862B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 862B substitutes the legacy x86 instruction set 8-bit displacement. Thus, the displacement factor field 862B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 872 operates as previously described.

Full Opcode Field

FIG. 9B is a block diagram illustrating the fields of the specific vector friendly instruction format 900 that make up the full opcode field 874 according to one embodiment of the invention. Specifically, the full opcode field 874 includes the format field 840, the base operation field 842, and the data element width (W) field 864. The base operation field 842 includes the prefix encoding field 925, the opcode map field 915, and the real opcode field 930.

Register Index Field

FIG. 9C is a block diagram illustrating the fields of the specific vector friendly instruction format 900 that make up the register index field 844 according to one embodiment of the invention. Specifically, the register index field 844 includes the REX field 905, the REX' field 910, the MODR/M.reg field 944, the MODR/M.r/m field 946, the VVVV field 920, xxx field 954, and the bbb field 956.

Augmentation Operation Field

Figure 9D:
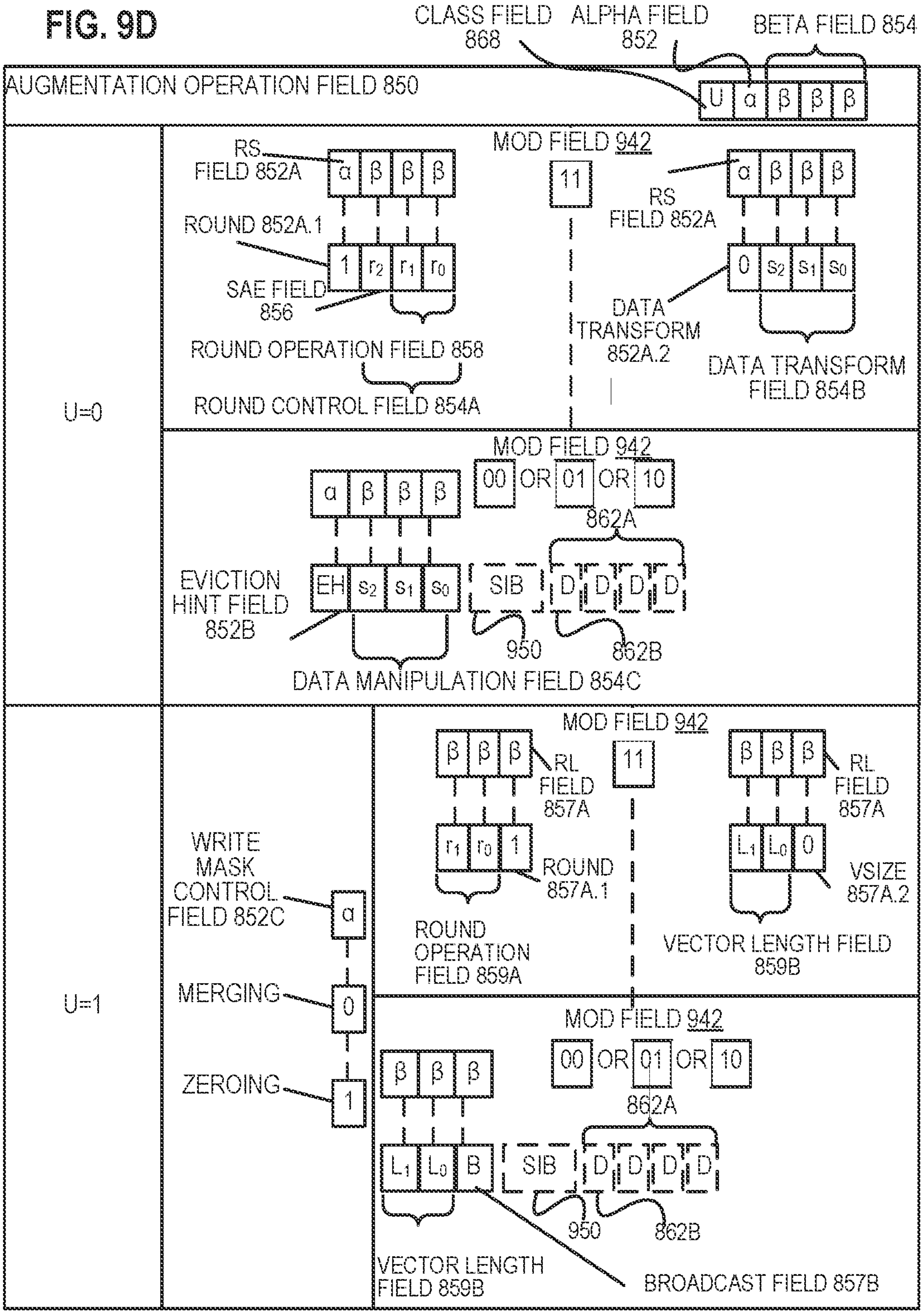
FIG. 9D is a block diagram illustrating the fields of the specific vector friendly instruction format that makes up an augmentation operation field according to one embodiment of the invention.

FIG. 9D is a block diagram illustrating the fields of the specific vector friendly instruction format that makes up the augmentation operation field 850 according to one embodiment of the invention. When the class (U) field 868 contains 0, it signifies EVEX.U0 (class A 868A); when it contains 1, it signifies EVEX.U1 (class B 868B). When U=0 and the MOD field 942 contains 11 (signifying a no memory access operation), the alpha field 852 (EVEX byte 3, bit [7]—EH) is interpreted as the rs field 852A. When the rs field 852A contains a 1 (round 852A.1), the beta field 854 (EVEX byte 3, bits [6:4]—SSS) is interpreted as the round control field 854A. The round control field 854A includes a one bit SAE field 856 and a two bit round operation field 858. When the rs field 852A contains a 0 (data transform 852A.2), the beta field 854 (EVEX byte 3, bits [6:4]—SSS) is interpreted as a three bit data transform field 854B. When U=0 and the MOD field 942 contains 00, 01, or 10 (signifying a memory access operation), the alpha field 852 (EVEX byte 3, bit [7]—EH) is interpreted as the eviction hint (EH) field 852B and the beta field 854 (EVEX byte 3, bits [6:4]—SSS) is interpreted as a three bit data manipulation field 854C.

When U=1, the alpha field 852 (EVEX byte 3, bit [7]—EH) is interpreted as the write mask control (Z) field 852C. When U=1 and the MOD field 942 contains 11 (signifying a no memory access operation), part of the beta field 854 (EVEX byte 3, bit [4]—$S_0$) is interpreted as the RL field 857A; when it contains a 1 (round 857A.1) the rest of the beta field 854 (EVEX byte 3, bit [6-5]—$S_{2-1}$) is interpreted as the round operation field 859A, while when the RL field 857A contains a 0 (VSIZE 857.A2) the rest of the beta field 854 (EVEX byte 3, bit [6-5]—$S_{2-1}$) is interpreted as the vector length field 859B (EVEX byte 3, bit [6-5]—$L_{1-0}$). When U=1 and the MOD field 942 contains 00, 01, or 10 (signifying a memory access operation), the beta field 854 (EVEX byte 3, bits [6:4]—SSS) is interpreted as the vector length field 859B (EVEX byte 3, bit [6-5]—$L_{1-0}$) and the broadcast field 857B (EVEX byte 3, bit [4]—B).

Exemplary Register Architecture

Figure 10:
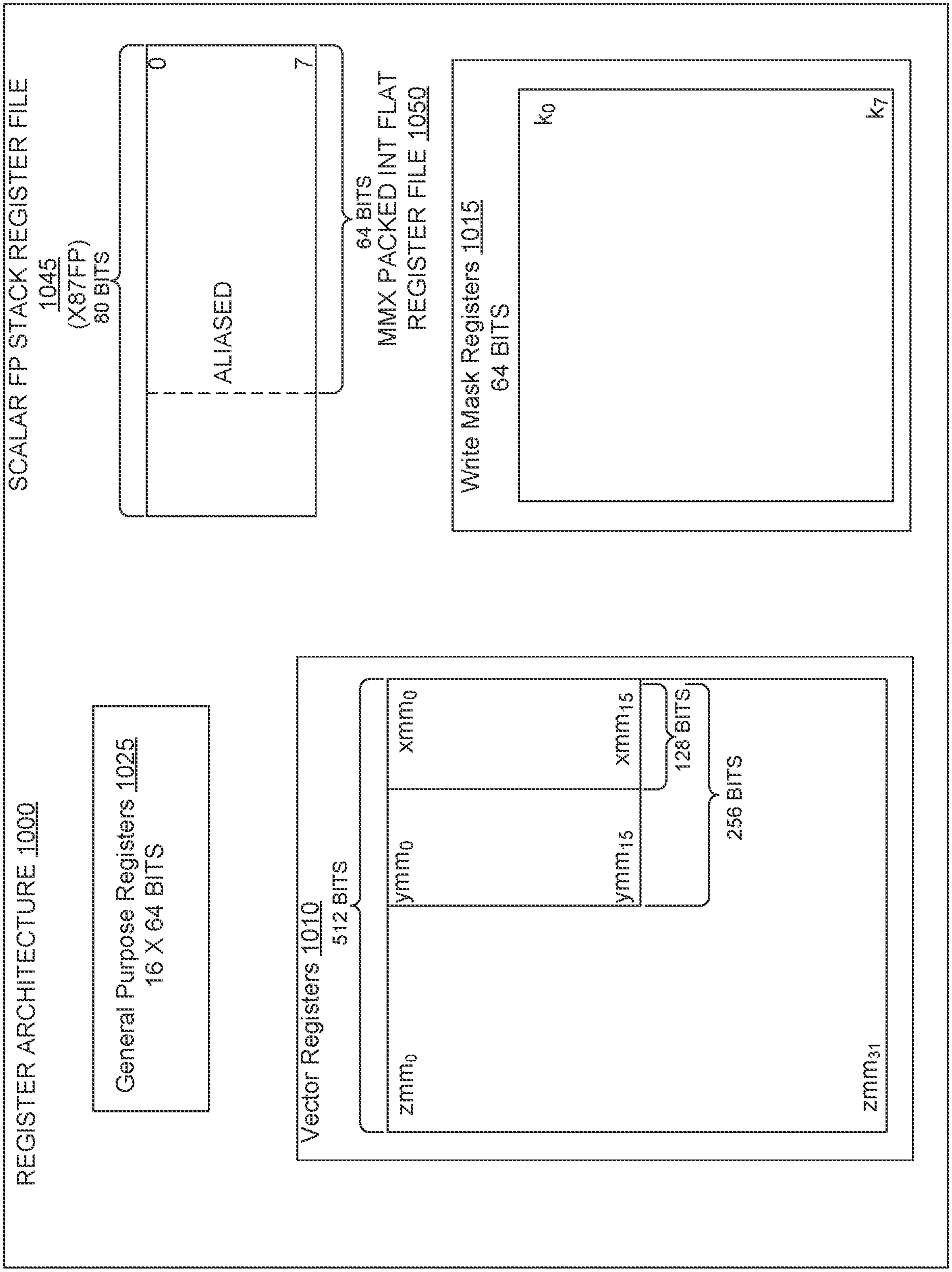
FIG. 10 is a block diagram of a register architecture according to one embodiment of the invention.

FIG. 10 is a block diagram of a register architecture 1000 according to one embodiment of the invention. In the embodiment illustrated, there are 32 vector registers 1010 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 900 operates on these overlaid register file as illustrated in the below tables.

| Adjustable Vector Length | Class | Operations | Registers |
|---|---|---|---|
| Instruction Templates that do not include the vector length field 859B | A (FIG. 8A; U = 0) | 810, 815, 825, 830 | zmm registers (the vector length is 64 byte) |
| | B (FIG. 8B; U = 1) | 812 | zmm registers (the vector length is 64 byte) |
| Instruction templates that do include the vector length field 859B | B (FIG. 8B; U = 1) | 817, 827 | zmm, ymm, or xmm registers (the vector length is 64 byte, 32 byte, or 16 byte) depending on the vector length field 859B |

In other words, the vector length field 859B selects between a maximum length and one or more other shorter lengths, where each such shorter length is half the length of the preceding length; and instructions templates without the vector length field 859B operate on the maximum vector length. Further, in one embodiment, the class B instruction templates of the specific vector friendly instruction format 900 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1015—in the embodiment illustrated, there are 8 write mask registers (k0 through k7), each 64 bits in size. In an alternate embodiment, the write mask registers 1015 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1025—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1045, on which is aliased the MMX packed integer flat register file 1050—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments may use wider or narrower registers. Additionally, alternative embodiments may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

Figure 11A:
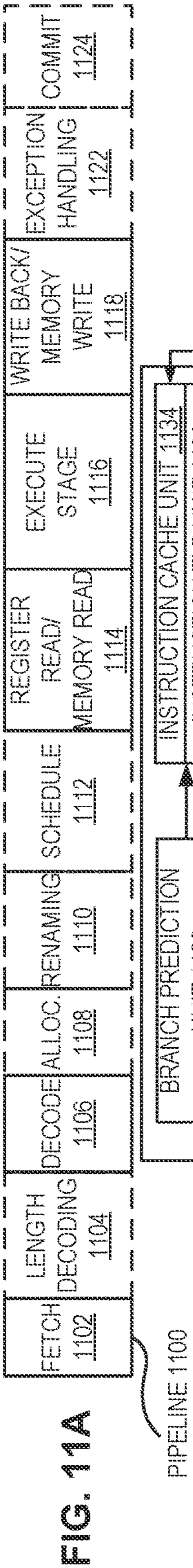
FIG. 11A is a block diagram illustrating both an exemplary in-order pipeline and an exemplary register renaming, out-of-order issue/execution pipeline according to some embodiments.
Figure 11B:
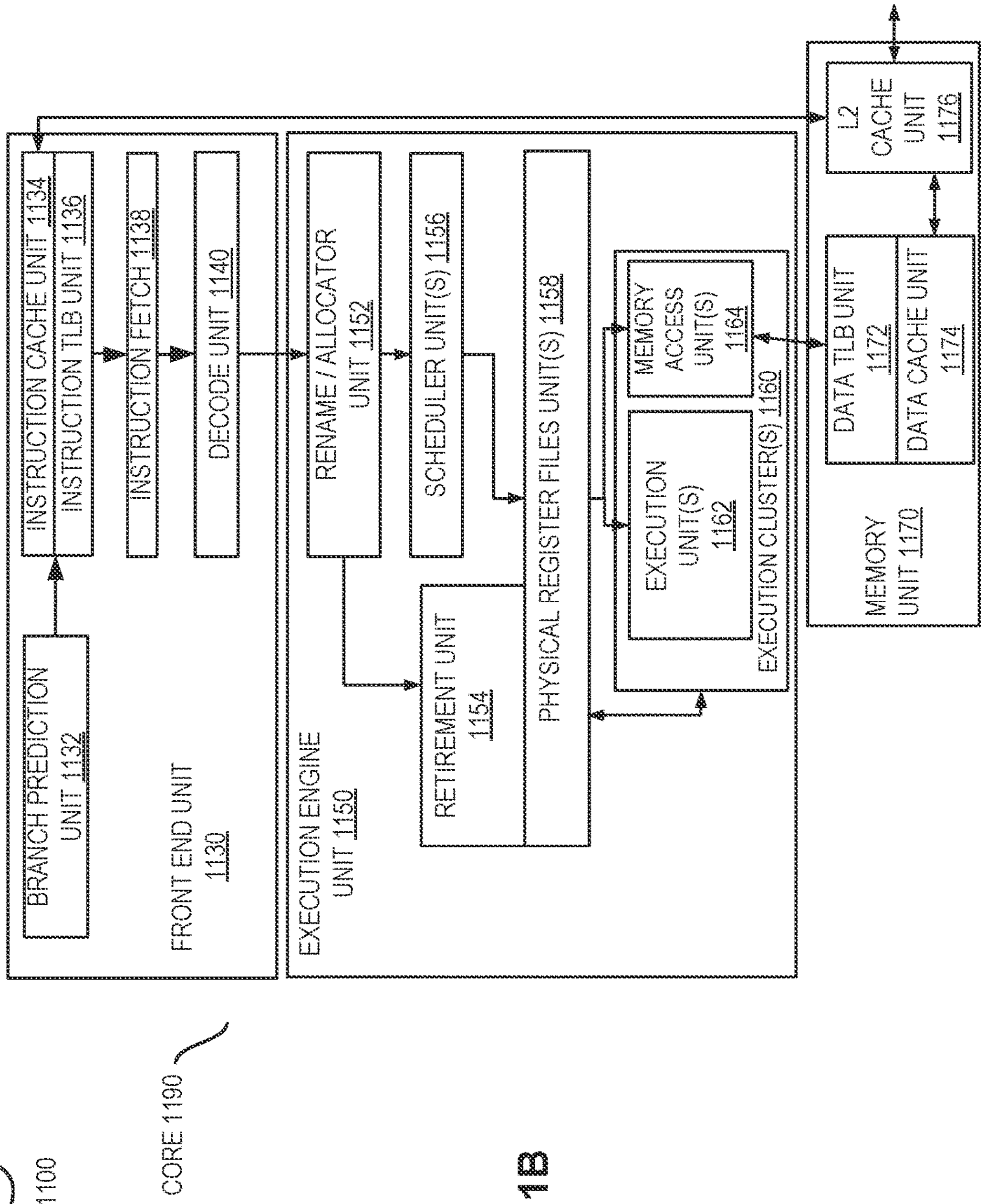
FIG. 11B is a block diagram illustrating both an exemplary embodiment of an in-order architecture core and an exemplary register renaming, out-of-order issue/execution architecture core to be included in a processor according to some embodiments.

FIG. 11A is a block diagram illustrating both an exemplary in-order pipeline and an exemplary register renaming, out-of-order issue/execution pipeline according to some embodiments. FIG. 11B is a block diagram illustrating both an exemplary embodiment of an in-order architecture core and an exemplary register renaming, out-of-order issue/execution architecture core to be included in a processor according to some embodiments. The solid lined boxes in FIGS. 11A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 11A, a processor pipeline 1100 includes a fetch stage 1102, a length decode stage 1104, a decode stage 1106, an allocation stage 1108, a renaming stage 1110, a scheduling (also known as a dispatch or issue) stage 1112, a register read/memory read stage 1114, an execute stage 1116, a write back/memory write stage 1118, an exception handling stage 1122, and a commit stage 1124.

FIG. 11B shows processor core 1190 including a front end unit 1130 coupled to an execution engine unit 1150, and both are coupled to a memory unit 1170. The core 1190 may be a reduced instruction set computing (RISC) core, a complex instruction set computing (CISC) core, a very long instruction word (VLIW) core, or a hybrid or alternative core type. As yet another option, the core 1190 may be a special-purpose core, such as, for example, a network or communication core, compression engine, coprocessor core, general purpose computing graphics processing unit (GPGPU) core, graphics core, or the like.

The front end unit 1130 includes a branch prediction unit 1132 coupled to an instruction cache unit 1134, which is coupled to an instruction translation lookaside buffer (TLB) 1136, which is coupled to an instruction fetch unit 1138, which is coupled to a decode unit 1140. The decode unit 1140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1190 includes a microcode ROM or other medium that stores microcode for certain macroinstructions (e.g., in decode unit 1140 or otherwise within the front end unit 1130). The decode unit 1140 is coupled to a rename/allocator unit 1152 in the execution engine unit 1150.

The execution engine unit 1150 includes the rename/allocator unit 1152 coupled to a retirement unit 1154 and a set of one or more scheduler unit(s) 1156. The scheduler unit(s) 1156 represents any number of different schedulers, including reservations stations, central instruction window, etc. The scheduler unit(s) 1156 is coupled to the physical register file(s) unit(s) 1158. Each of the physical register file(s) units 1158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1158 comprises a vector registers unit, a write mask registers unit, and a scalar registers unit. These register units may provide architectural vector registers, vector mask registers, and general purpose registers. The physical register file(s) unit(s) 1158 is overlapped by the retirement unit 1154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1154 and the physical register file(s) unit(s) 1158 are coupled to the execution cluster(s) 1160. The execution cluster(s) 1160 includes a set of one or more execution units 1162 and a set of one or more memory access units 1164. The execution units 1162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1156, physical register file(s) unit(s) 1158, and execution cluster(s) 1160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1164). It should also be understood that where separate pipelines are used, one or more of these pipelines may be out-of-order issue/execution and the rest in-order.

The set of memory access units 1164 is coupled to the memory unit 1170, which includes a data TLB unit 1172 coupled to a data cache unit 1174 coupled to a level 2 (L2) cache unit 1176. In one exemplary embodiment, the memory access units 1164 may include a load unit, a store address unit, and a store data unit, each of which is coupled to the data TLB unit 1172 in the memory unit 1170. The instruction cache unit 1134 is further coupled to a level 2 (L2) cache unit 1176 in the memory unit 1170. The L2 cache unit 1176 is coupled to one or more other levels of cache and eventually to a main memory.

By way of example, the exemplary register renaming, out-of-order issue/execution core architecture may implement the pipeline 1100 as follows: 1) the instruction fetch 1138 performs the fetch and length decoding stages 1102 and 1104; 2) the decode unit 1140 performs the decode stage 1106; 3) the rename/allocator unit 1152 performs the allocation stage 1108 and renaming stage 1110; 4) the scheduler unit(s) 1156 performs the schedule stage 1112; 5) the physical register file(s) unit(s) 1158 and the memory unit 1170 perform the register read/memory read stage 1114; the execution cluster 1160 perform the execute stage 1116; 6) the memory unit 1170 and the physical register file(s) unit(s) 1158 perform the write back/memory write stage 1118; 7) various units may be involved in the exception handling stage 1122; and 8) the retirement unit 1154 and the physical register file(s) unit(s) 1158 perform the commit stage 1124.

The core 1190 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 1190 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1134/1174 and a shared L2 cache unit 1176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 12B:
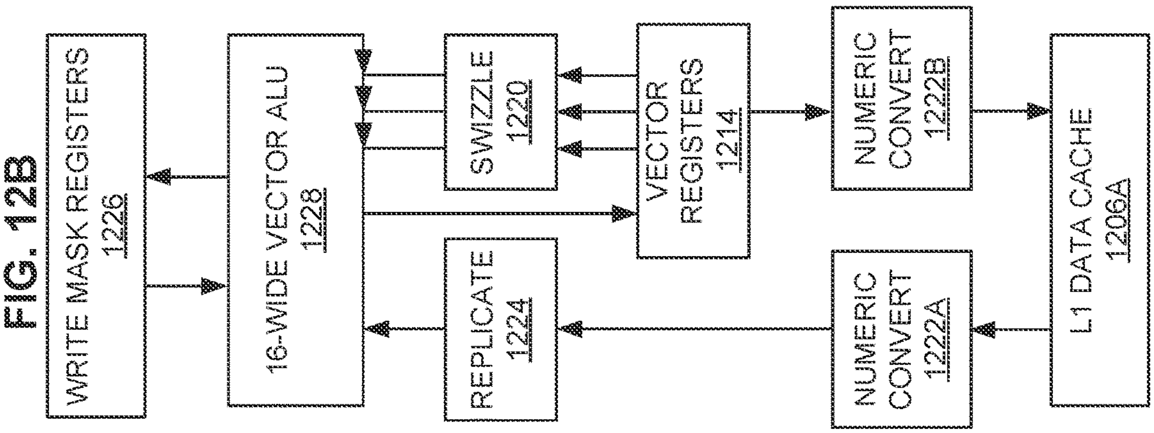
FIGS. 12A-B illustrate a block diagram of a more specific exemplary in-order core architecture, which core would be one of several logic blocks (including other cores of the same type and/or different types) in a chip.
Figure 12A:
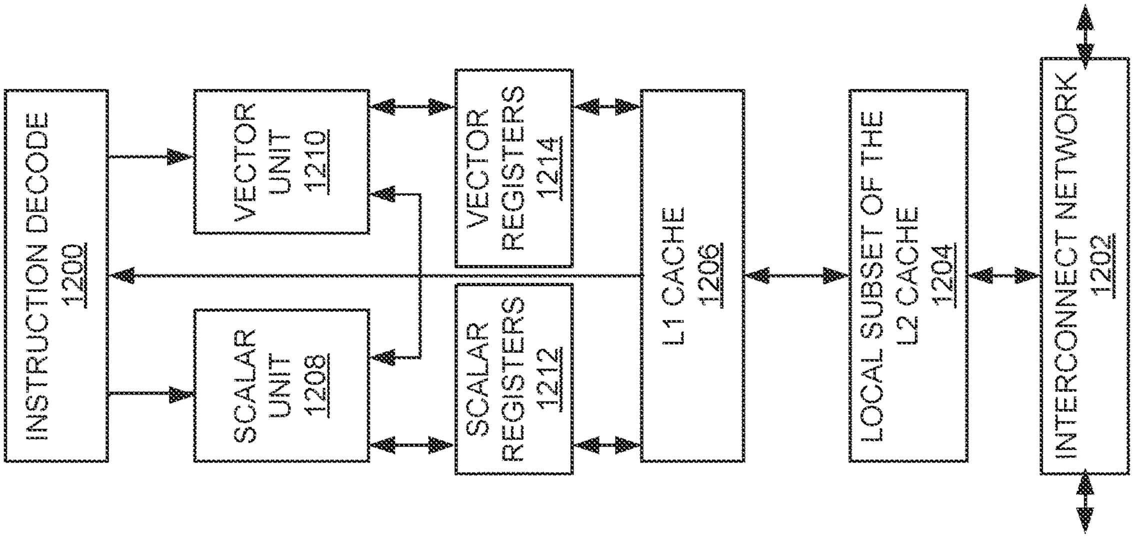

FIGS. 12A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

Execution circuitry to execute the SDMM instruction according to disclosed embodiments is illustrated and discussed at least with respect to FIGS. 3-6, and FIGS. 11-12.

FIG. 12A is a block diagram of a single processor core, along with its connection to the on-die interconnect network 1202 and with its local subset of the Level 2 (L2) cache 1204, according to some embodiments. In one embodiment, an instruction decoder 1200 supports the x86 instruction set with a packed data instruction set extension. An L1 cache 1206 allows low-latency accesses to cache memory into the scalar and vector units. While in one embodiment (to simplify the design), a scalar unit 1208 and a vector unit 1210 use separate register sets (respectively, scalar registers 1212 and vector registers 1214) and data transferred between them is written to memory and then read back in from a level 1 (L1) cache 1206, alternative embodiments may use a different approach (e.g., use a single register set or include a communication path that allow data to be transferred between the two register files without being written and read back).

The local subset of the L2 cache 1204 is part of a global L2 cache that is divided into separate local subsets, one per processor core. Each processor core has a direct access path to its own local subset of the L2 cache 1204. Data read by a processor core is stored in its L2 cache subset 1204 and can be accessed quickly, in parallel with other processor cores accessing their own local L2 cache subsets. Data written by a processor core is stored in its own L2 cache subset 1204 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 12B is an expanded view of part of the processor core in FIG. 12A according to some embodiments. FIG. 12B includes an L1 data cache 1206A part of the L1 cache 1204, as well as more detail regarding the vector unit 1210 and the vector registers 1214. Specifically, the vector unit 1210 is a 16-wide vector processing unit (VPU) (see the 16-wide ALU 1228), which executes one or more of integer, single-precision float, and double-precision float instructions. The VPU supports swizzling the register inputs with swizzle unit 1220, numeric conversion with numeric convert units 1222A-B, and replication with replication unit 1224 on the memory input. Write mask registers 1226 allow predicating resulting vector writes.

Execution circuitry to execute the SDMM instruction according to disclosed embodiments is illustrated and discussed at least with respect to FIGS. 3-6, and FIGS. 11-12.

Figure 13:
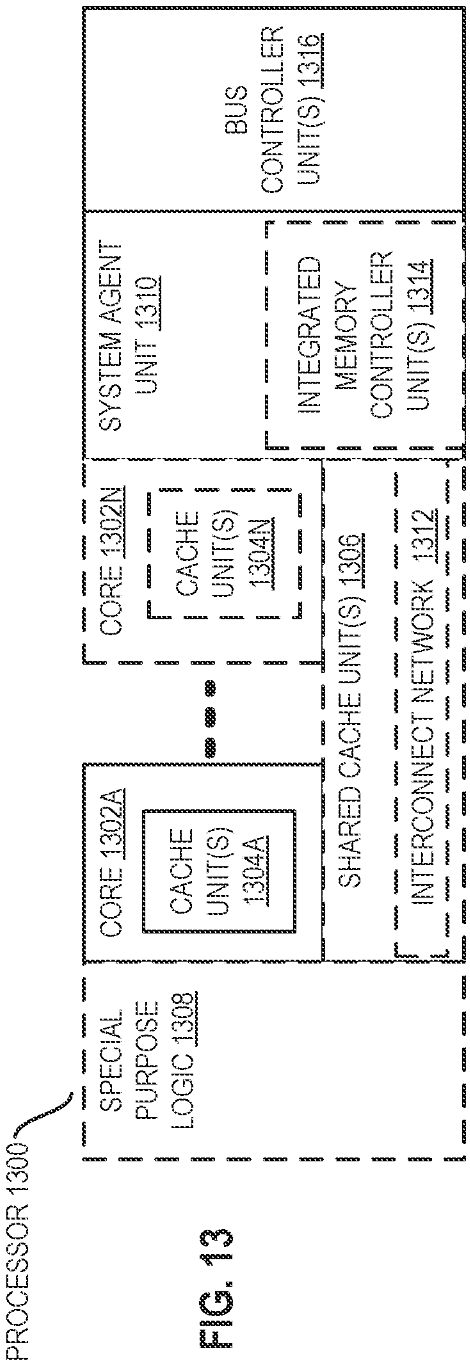
FIG. 13 is a block diagram of a processor that may have more than one core, may have an integrated memory controller, and may have integrated graphics according to some embodiments.

FIG. 13 is a block diagram of a processor 1300 that may have more than one core, may have an integrated memory controller, and may have integrated graphics according to some embodiments. The solid lined boxes in FIG. 13 illustrate a processor 1300 with a single core 1302A, a system agent 1310, a set of one or more bus controller units 1316, while the optional addition of the dashed lined boxes illustrates an alternative processor 1300 with multiple cores 1302A-N, a set of one or more integrated memory controller unit(s) 1314 in the system agent unit 1310, and special purpose logic 1308.

Thus, different implementations of the processor 1300 may include: 1) a CPU with the special purpose logic 1308 being integrated graphics and/or scientific (throughput) logic (which may include one or more cores), and the cores 1302A-N being one or more general purpose cores (e.g., general purpose in-order cores, general purpose out-of-order cores, a combination of the two); 2) a coprocessor with the cores 1302A-N being a large number of special purpose cores intended primarily for graphics and/or scientific (throughput); and 3) a coprocessor with the cores 1302A-N being a large number of general purpose in-order cores. Thus, the processor 1300 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1300 may be a part of and/or may be implemented on one or more substrates using any of many process technologies, such as, for example, BiCMOS, CMOS, or NMOS.

The memory hierarchy includes one or more levels of cache within the cores, a set or one or more shared cache units 1306, and external memory (not shown) coupled to the set of integrated memory controller units 1314. The set of shared cache units 1306 may include one or more mid-level caches, such as level 2 (L2), level 3 (L3), level 4 (L4), or other levels of cache, a last level cache (LLC), and/or combinations thereof. While in one embodiment a ring based interconnect unit 1312 interconnects the integrated graphics logic 1308 (integrated graphics logic 1308 is an example of and is also referred to herein as special purpose logic), the set of shared cache units 1306, and the system agent unit 1310/integrated memory controller unit(s) 1314, alternative embodiments may use any number of well-known techniques for interconnecting such units. In one embodiment, coherency is maintained between one or more cache units 1306 and cores 1302-A-N.

In some embodiments, one or more of the cores 1302A-N are capable of multi-threading. The system agent 1310 includes those components coordinating and operating cores 1302A-N. The system agent unit 1310 may include for example a power control unit (PCU) and a display unit. The PCU may be or include logic and components needed for regulating the power state of the cores 1302A-N and the integrated graphics logic 1308. The display unit is for driving one or more externally connected displays.

The cores 1302A-N may be homogenous or heterogeneous in terms of architecture instruction set; that is, two or more of the cores 1302A-N may be capable of execution the same instruction set, while others may can execute only a subset of that instruction set or a different instruction set.

Exemplary Computer Architectures

FIGS. 14-17 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 14:
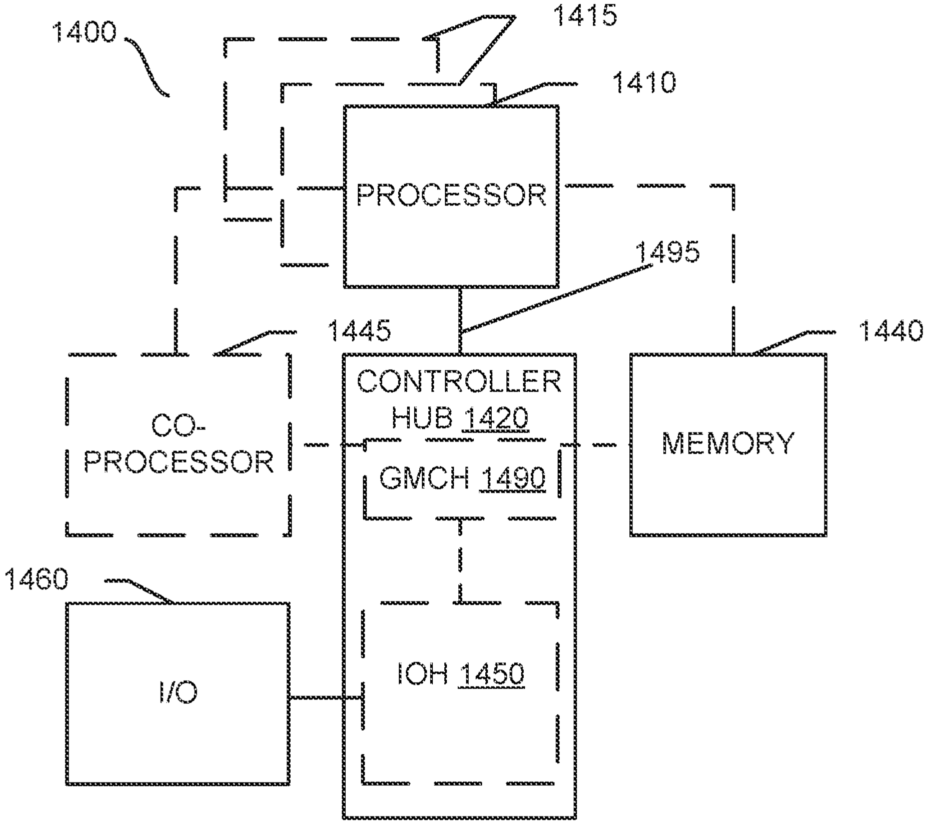
FIGS. 14-17 are block diagrams of exemplary computer architectures.

Referring now to FIG. 14, shown is a block diagram of a system 1400 in accordance with one embodiment of the present invention. The system 1400 may include one or more processors 1410, 1415, which are coupled to a controller hub 1420. In one embodiment the controller hub 1420 includes a graphics memory controller hub (GMCH) 1490 and an Input/Output Hub (IOH) 1450 (which may be on separate chips); the GMCH 1490 includes memory and graphics controllers to which are coupled memory 1440 and a coprocessor 1445; the IOH 1450 couples input/output (I/O) devices 1460 to the GMCH 1490. Alternatively, one or both memory and graphics controllers are integrated within the processor (as described herein), the memory 1440 and the coprocessor 1445 are coupled directly to the processor 1410, and the controller hub 1420 in a single chip with the IOH 1450.

The optional nature of additional processors 1415 is denoted in FIG. 14 with broken lines. Each processor 1410, 1415 may include one or more of the processing cores described herein and may be some version of the processor 1300.

The memory 1440 may be, for example, dynamic random access memory (DRAM), phase change memory (PCM), or a combination of the two. For at least one embodiment, the controller hub 1420 communicates with the processor(s) 1410, 1415 via a multi-drop bus, such as a frontside bus (FSB), point-to-point interface such as QuickPath Interconnect (QPI), or similar connection 1495.

In one embodiment, the coprocessor 1445 is a special-purpose processor, such as, for example, a high-throughput MIC processor, a network or communication processor, compression engine, graphics processor, GPGPU, embedded processor, or the like. In one embodiment, controller hub 1420 may include an integrated graphics accelerator.

There can be a variety of differences between the physical resources 1410, 1415 in terms of a spectrum of metrics of merit including architectural, microarchitectural, thermal, power consumption characteristics, and the like.

In one embodiment, the processor 1410 executes instructions that control data processing operations of a general type. Embedded within the instructions may be coprocessor instructions. The processor 1410 recognizes these coprocessor instructions as being of a type that should be executed by the attached coprocessor 1445. Accordingly, the processor 1410 issues these coprocessor instructions (or control signals representing coprocessor instructions) on a coprocessor bus or other interconnect, to coprocessor 1445. Coprocessor(s) 1445 accept and execute the received coprocessor instructions.

Figure 15:
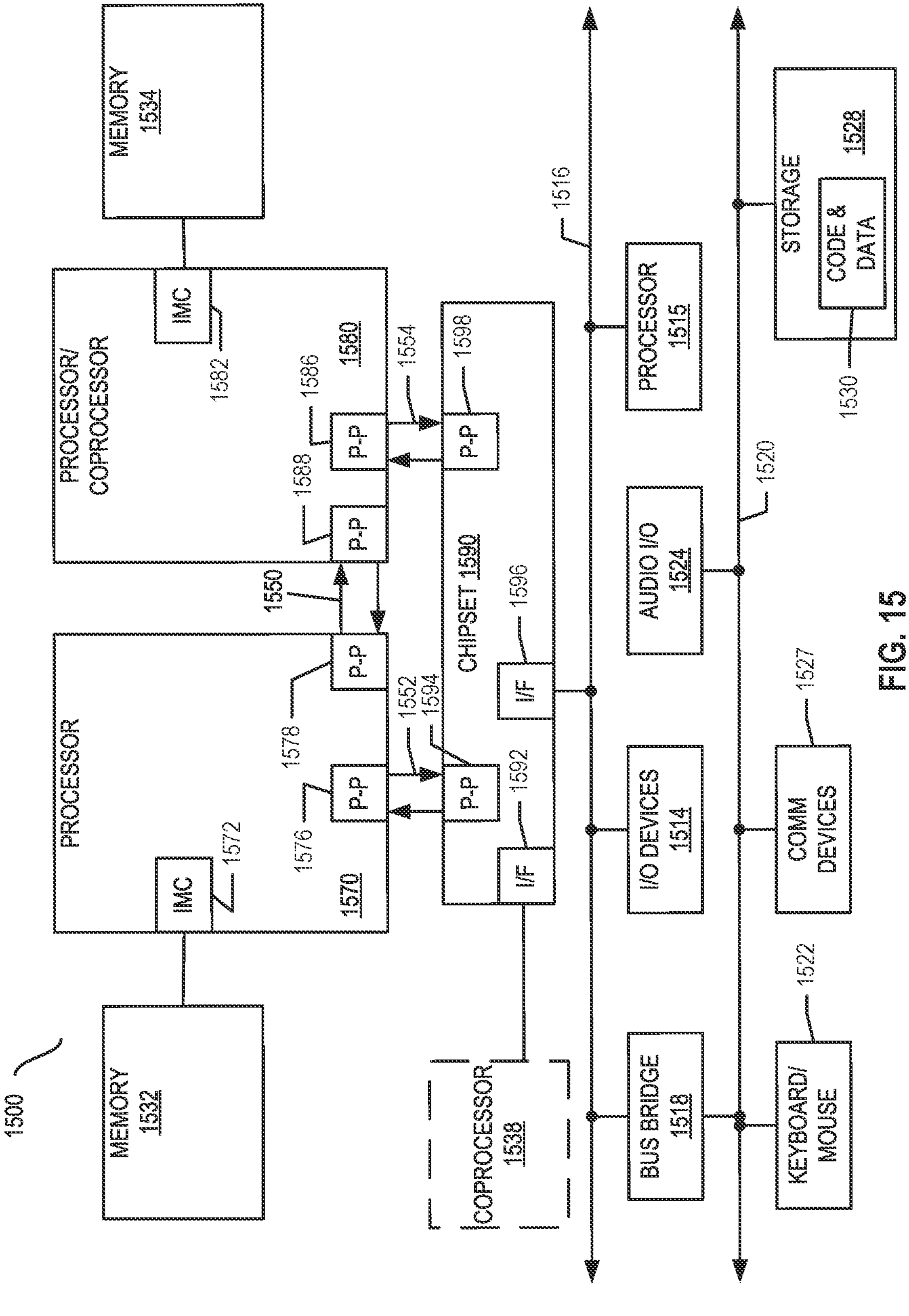

Referring now to FIG. 15, shown is a block diagram of a first more specific exemplary system 1500 in accordance with an embodiment of the present invention. As shown in FIG. 15, multiprocessor system 1500 is a point-to-point interconnect system, and includes a first processor 1570 and a second processor 1580 coupled via a point-to-point interconnect 1550. Each of processors 1570 and 1580 may be some version of the processor 1300. In one embodiment of the invention, processors 1570 and 1580 are respectively processors 1410 and 1415, while coprocessor 1538 is coprocessor 1445. In another embodiment, processors 1570 and 1580 are respectively processor 1410 coprocessor 1445.

Processors 1570 and 1580 are shown including integrated memory controller (IMC) units 1572 and 1582, respectively. Processor 1570 also includes as part of its bus controller units point-to-point (P-P) interfaces 1576 and 1578; similarly, second processor 1580 includes P-P interfaces 1586 and 1588. Processors 1570, 1580 may exchange information via a point-to-point (P-P) interface 1550 using P-P interface circuits 1578, 1588. As shown in FIG. 15, IMCs 1572 and 1582 couple the processors to respective memories, namely a memory 1532 and a memory 1534, which may be portions of main memory locally attached to the respective processors.

Processors 1570, 1580 may each exchange information with a chipset 1590 via individual P-P interfaces 1552, 1554 using point to point interface circuits 1576, 1594, 1586, 1598. Chipset 1590 may optionally exchange information with the coprocessor 1538 via a high-performance interface 1592. In one embodiment, the coprocessor 1538 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1590 may be coupled to a first bus 1516 via an interface 1596. In one embodiment, first bus 1516 may be a Peripheral Component Interconnect (PCI) bus, or a bus such as a PCI Express bus or another third generation I/O interconnect bus, although the scope of the present invention is not so limited.

As shown in FIG. 15, various I/O devices 1514 may be coupled to first bus 1516, along with a bus bridge 1518 which couples first bus 1516 to a second bus 1520. In one embodiment, one or more additional processor(s) 1515, such as coprocessors, high-throughput MIC processors, GPGPU's, accelerators (such as, e.g., graphics accelerators or digital signal processing (DSP) units), field programable gate arrays, or any other processor, are coupled to first bus 1516. In one embodiment, second bus 1520 may be a low pin count (LPC) bus. Various devices may be coupled to a second bus 1520 including, for example, a keyboard and/or mouse 1522, communication devices 1527 and a storage unit 1528 such as a disk drive or other mass storage device which may include instructions/code and data 1530, in one embodiment. Further, an audio I/O 1524 may be coupled to the second bus 1520. Note that other architectures are possible. For example, instead of the point-to-point architecture of FIG. 15, a system may implement a multi-drop bus or other such architecture.

Figure 16:
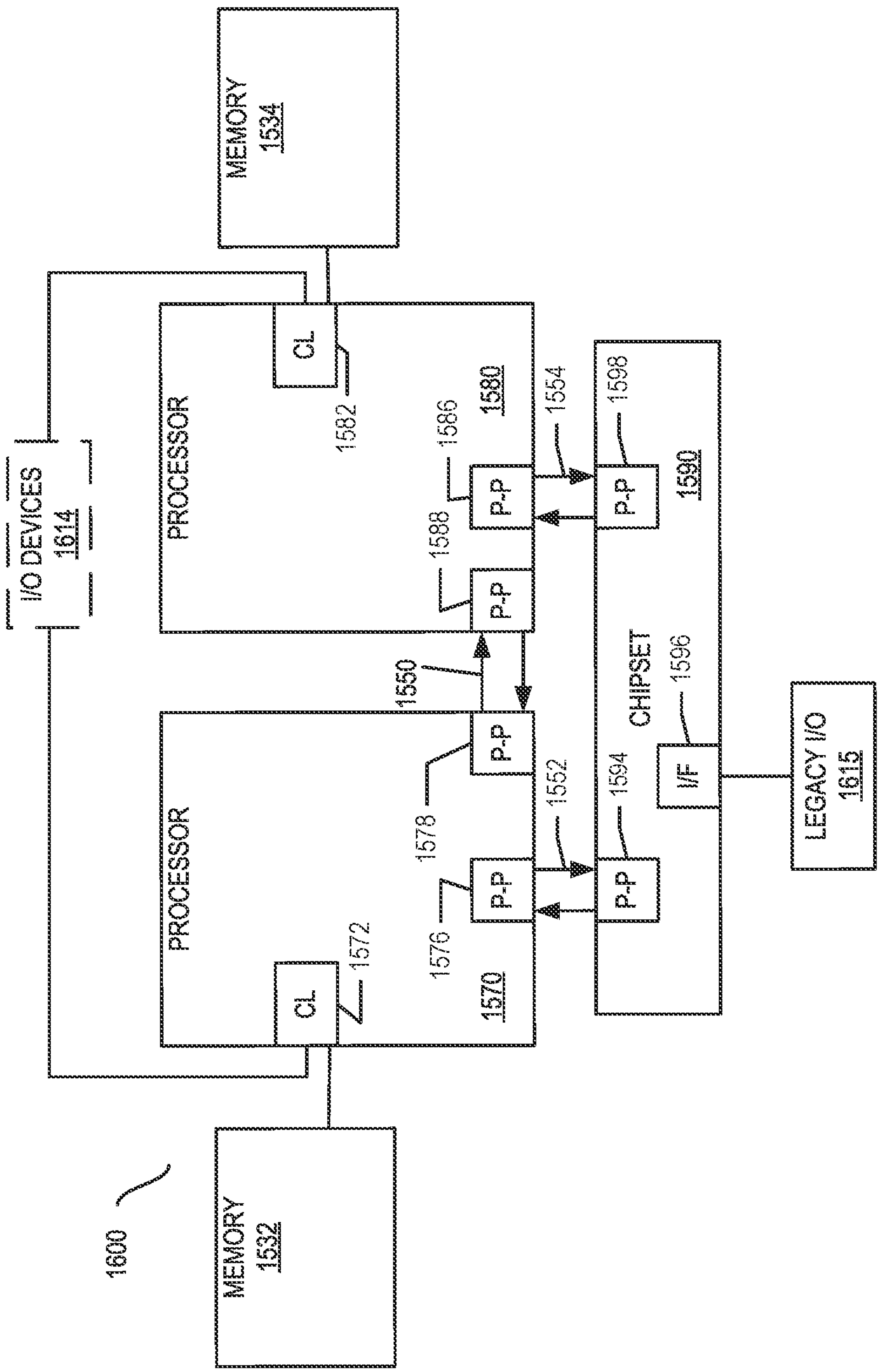

Referring now to FIG. 16, shown is a block diagram of a second more specific exemplary system 1600 in accordance with an embodiment of the present invention. Like elements in FIGS. 15 and 16 bear like reference numerals, and certain aspects of FIG. 15 have been omitted from FIG. 16 to avoid obscuring other aspects of FIG. 16.

FIG. 16 illustrates that the processors 1570, 1580 may include integrated memory and I/O control logic ("CL") 1572 and 1582, respectively. Thus, the CL 1572, 1582 include integrated memory controller units and include I/O control logic. FIG. 16 illustrates that not only are the memories 1532, 1534 coupled to the CL 1572, 1582, but also that I/O devices 1614 are also coupled to the control logic 1572, 1582. Legacy I/O devices 1615 are coupled to the chipset 1590.

Figure 17:
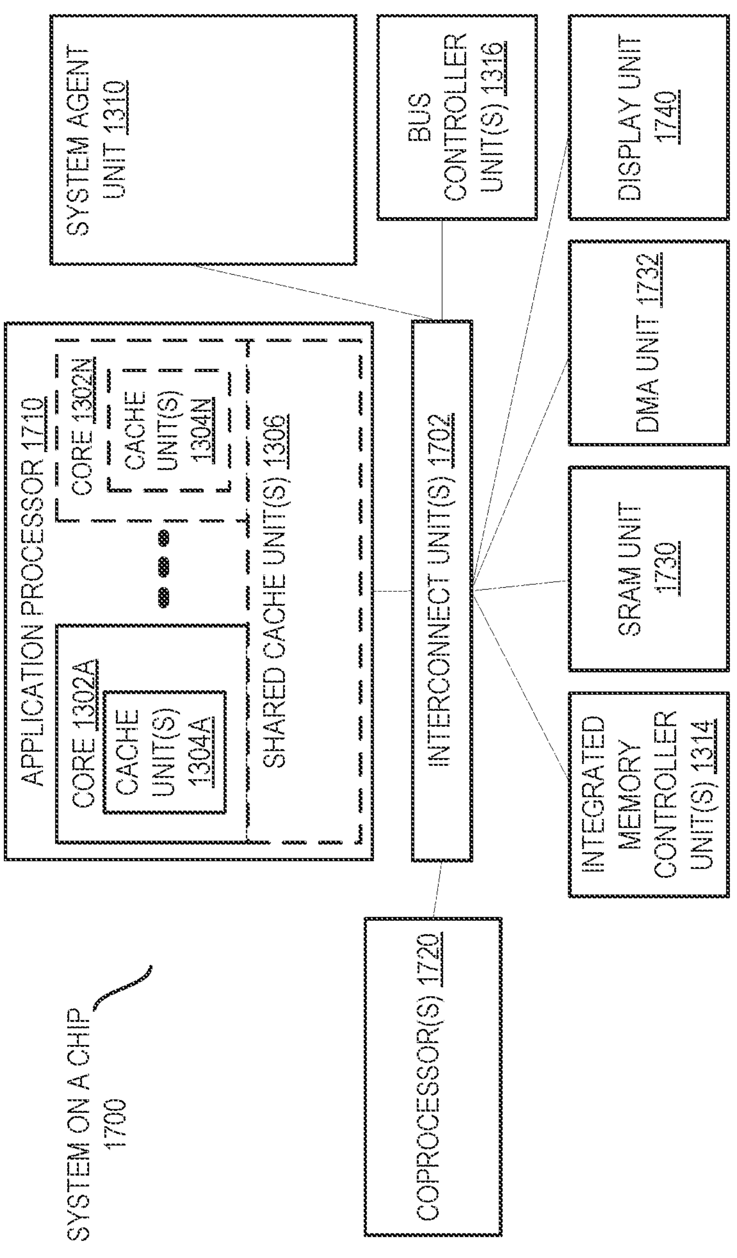

Referring now to FIG. 17, shown is a block diagram of a SoC 1700 in accordance with an embodiment of the present invention. Similar elements in FIG. 13 bear like reference numerals. Also, dashed lined boxes are optional features on more advanced SoCs. In FIG. 17, an interconnect unit(s) 1702 is coupled to: an application processor 1710 which includes a set of one or more cores 1302A-N, which include cache units 1304A-N, and shared cache unit(s) 1306; a system agent unit 1310; a bus controller unit(s) 1316; an integrated memory controller unit(s) 1314; a set or one or more coprocessors 1720 which may include integrated graphics logic, an image processor, an audio processor, and a video processor; a Static random access memory (SRAM) unit 1730; a direct memory access (DMA) unit 1732; and a display unit 1740 for coupling to one or more external displays. In one embodiment, the coprocessor(s) 1720 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Some embodiments may be implemented as computer programs or program code executing on programmable systems comprising at least one processor, a storage system (including volatile and non-volatile memory and/or storage elements), at least one input device, and at least one output device.

Program code, such as code 1530 illustrated in FIG. 15, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, some embodiments also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphine, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 18:
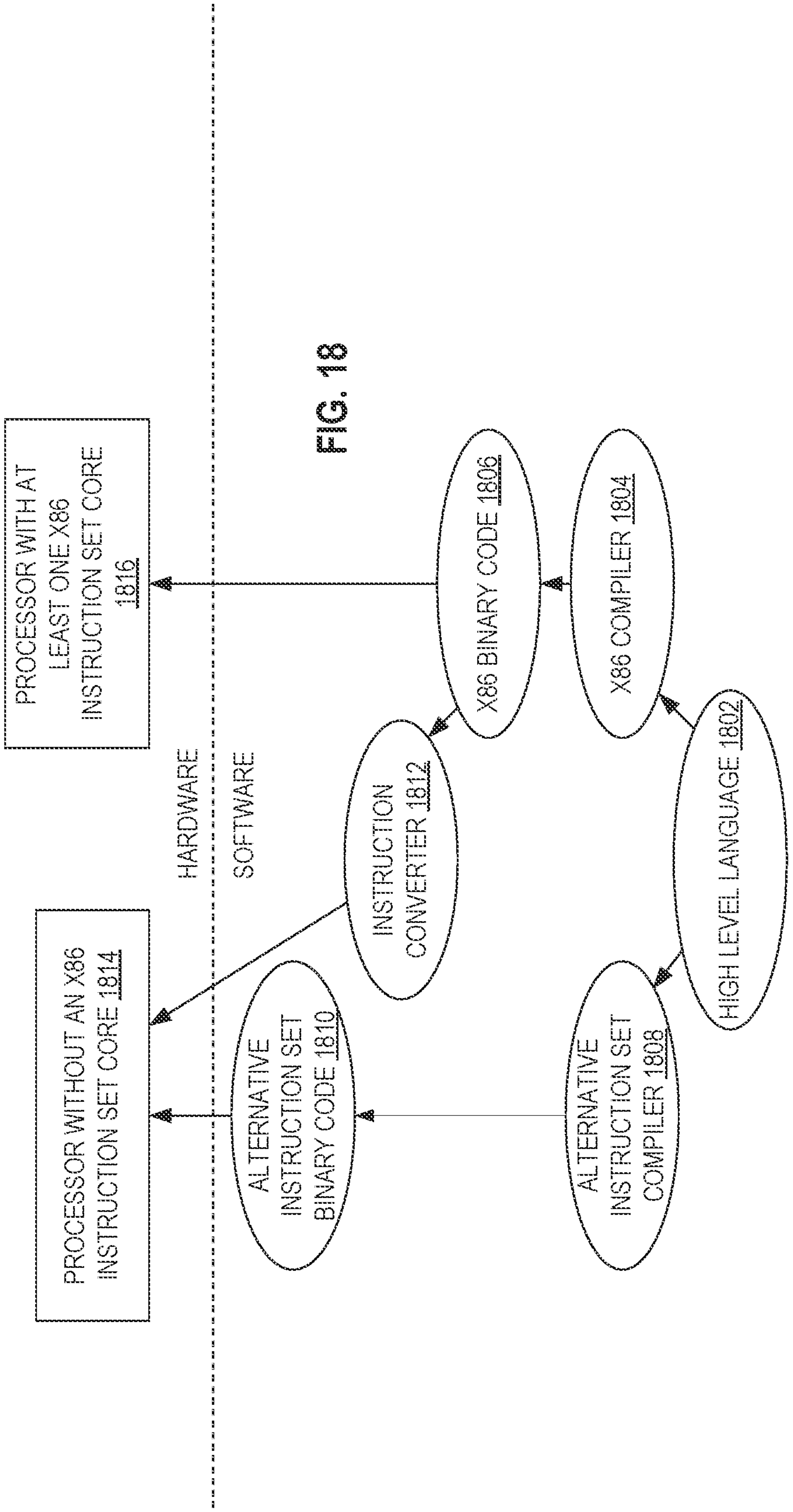
FIG. 18 is a block diagram contrasting the use of a software instruction converter to convert binary instructions in a source instruction set to binary instructions in a target instruction set according to some embodiments.

FIG. 18 is a block diagram contrasting the use of a software instruction converter to convert binary instructions in a source instruction set to binary instructions in a target instruction set according to some embodiments. In the illustrated embodiment, the instruction converter is a software instruction converter, although alternatively the instruction converter may be implemented in software, firmware, hardware, or various combinations thereof. FIG. 18 shows a program in a high level language 1802 may be compiled using an x86 compiler 1804 to generate x86 binary code 1806 that may be natively executed by a processor with at least one x86 instruction set core 1816. The processor with at least one x86 instruction set core 1816 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1804 represents a compiler that is operable to generate x86 binary code 1806 (e.g., object code) that can, with or without additional linkage processing, be executed on the processor with at least one x86 instruction set core 1816. Similarly, FIG. 18 shows the program in the high level language 1802 may be compiled using an alternative instruction set compiler 1808 to generate alternative instruction set binary code 1810 that may be natively executed by a processor without at least one x86 instruction set core 1814 (e.g., a processor with cores that execute the MIPS instruction set of MIPS Technologies of Sunnyvale, CA and/or that execute the ARM instruction set of ARM Holdings of Sunnyvale, CA). The instruction converter 1812 is used to convert the x86 binary code 1806 into code that may be natively executed by the processor without an x86 instruction set core 1814. This converted code is not likely to be the same as the alternative instruction set binary code 1810 because an instruction converter capable of this is difficult to make; however, the converted code will accomplish the general operation and be made up of instructions from the alternative instruction set. Thus, the instruction converter 1812 represents software, firmware, hardware, or a combination thereof that, through emulation, simulation or any other process, allows a processor or other electronic device that does not have an x86 instruction set processor or core to execute the x86 binary code 1806.

FURTHER EXAMPLES

Example 1 provides an exemplary processor to execute a sparse-dense matrix multiplication instruction, comprising: fetch circuitry to fetch, from code storage, the sparse-dense matrix multiplication instruction having fields to specify an opcode, a dense output matrix, a dense source matrix, and a sparse source matrix having a sparsity of non-zero elements, the sparsity being less than one, decode circuitry to decode the fetched sparse-dense matrix multiplication instruction, execution circuitry to execute the decoded sparse-dense matrix multiplication instruction to, for each non-zero element at row M and column K of the sparse source matrix: generate a product of the non-zero element and each corresponding dense element at row K and column N of the dense source matrix, and generate an accumulated sum of each generated product and a previous value of a corresponding output element at row M and column N of the dense output matrix.

Example 2 includes the substance of the exemplary processor of Example 1, wherein the sparsity is 0.125 or less.

Example 3 includes the substance of the exemplary processor of Example 1, wherein the sparse-dense matrix multiplication instruction further specifies a size of data elements of the specified matrices, the size being one of 8 bits, 16 bits, 32 bits, 64 bits, and 128 bits, the size being specified either as an operand of the instruction or as part of the opcode.

Example 4 includes the substance of the exemplary processor of Example 1, wherein the sparse-dense matrix multiplication instruction further specifies a format of data elements of the specified matrices, the format being one of fixed-point, single-precision floating point, double-precision floating point, extended precision floating point, and double-extended precision floating point.

Example 5 includes the substance of the exemplary processor of any one of Examples 1-4, wherein the execution circuitry generates the products using multipliers having a same size as data elements of the specified matrices, generates the accumulated sums using accumulators having twice the size of the data elements of the specified matrices, and performs saturation and rounding on each of the accumulated sums before writing the saturated and rounded accumulated sum to the specified dense output matrix.

Example 6 includes the substance of the exemplary processor of any one of Examples 1-4, wherein the execution circuitry comprises a single instruction multiple data (SIMD) execution circuit comprising a plurality of multipliers and a plurality of accumulators to execute the decoded sparse-dense matrix multiplication on a plurality of the non-zero elements of the sparse source matrix in parallel, the plurality of non-zero elements comprising one of 64, 128, 256, and 512 elements.

Example 7 includes the substance of the exemplary processor of any one of Examples 1-4, further comprising: a memory read circuit to read the specified matrices and write results to a memory and, wherein the sparse source matrix is stored in the memory in a compressed format, the compressed format including only the non-zero elements of the sparse source matrix, each non-zero element being represented by a data value and a matrix location, and wherein the memory read circuit reads the sparse source matrix in the compressed format.

Example 8 includes the substance of the exemplary processor of Example 7, wherein the compressed format is either a compressed sparse row (CSR) format storing the non-zero elements in row-major order, or a compressed sparse column (CSC) format storing the non-zero elements in column-major order.

Example 9 includes the substance of the exemplary processor of Example 8, wherein the sparse source matrix comprises a predetermined number of rows and a predetermined number of columns, and wherein the matrix location specifies an index of the non-zero element within the sparse source matrix.

Example 10 includes the substance of the exemplary processor of Example 8, wherein the sparse source matrix comprises a predetermined number of rows and a predetermined number of columns, wherein the compressed format, when using the CSR format, further specifies a number of non-zero elements in each row, and specifies the matrix location as an index of the non-zero element within the row, and wherein the compressed format, when using the CSC format, further specifies a number of non-zero elements in each column, and specifies the matrix location as an index of the non-zero element within the column.

Example 11 provides an exemplary method of executing a sparse-dense matrix multiplication instruction, comprising: fetching from code storage, using fetch circuitry, the sparse-dense matrix multiplication instruction having fields to specify an opcode, a dense output matrix, a dense source matrix, and a sparse source matrix having a sparsity of non-zero elements, the sparsity being less than one, decoding, by decode circuitry, the fetched sparse-dense matrix multiplication instruction, executing, by execution circuitry, the decoded sparse-dense matrix multiplication instruction to, for each non-zero element at row M and column K of the sparse source matrix: generate a product of the non-zero element and each corresponding dense element at row K and column N of the dense source matrix, and generate an accumulated sum of each generated product and a previous value of a corresponding output element at row M and column N of the dense output matrix.

Example 12 includes the substance of the exemplary method of Example 11, wherein the sparsity is 0.125 or less.

Example 13 includes the substance of the exemplary method of Example 11, wherein the sparse-dense matrix multiplication instruction further specifies a size of data elements of the specified matrices, the size being one of 8 bits, 16 bits, 32 bits, 64 bits, and 128 bits, the size being specified either as an operand of the instruction or as part of the opcode.

Example 14 includes the substance of the exemplary method of Example 11, wherein the sparse-dense matrix multiplication instruction further specifies a format of data elements of the specified matrices, the format being one of fixed-point, single-precision floating point, double-precision floating point, extended precision floating point, and double-extended precision floating point.

Example 15 includes the substance of the exemplary method of any one of Examples 11-14, wherein the execution circuitry generates the products using multipliers having a same size as data elements of the specified matrices, generates the accumulated sums using accumulators having twice the size of the data elements of the specified matrices, and performs saturation and rounding on each of the accumulated sums before writing the saturated and rounded accumulated sum to the specified dense output matrix.

Example 16 includes the substance of the exemplary method of any one of Examples 11-14, wherein the execution circuitry comprises a single instruction multiple data (SIMD) execution circuit comprising a plurality of multipliers and a plurality of accumulators to execute the decoded sparse-dense matrix multiplication on a plurality of the non-zero elements of the sparse source matrix in parallel, the plurality of non-zero elements comprising one of 64, 128, 256, and 512 elements.

Example 17 includes the substance of the exemplary method of any one of Examples 11-14, further comprising: a memory read circuit to read the specified matrices and write results to a memory and, wherein the sparse source matrix is stored in the memory in a compressed format, the compressed format including only the non-zero elements of the sparse source matrix, each non-zero element being represented by a data value and a matrix location, and wherein the memory read circuit reads the sparse source matrix in the compressed format.

Example 18 includes the substance of the exemplary method of Example 17, wherein the compressed format is either a compressed sparse row (CSR) format storing the non-zero elements in row-major order, or a compressed sparse column (CSC) format storing the non-zero elements in column-major order.

Example 19 includes the substance of the exemplary method of Example 18, wherein the sparse source matrix comprises a predetermined number of rows and a predetermined number of columns, and wherein the matrix location specifies an index of the non-zero element within the sparse source matrix.

Example 20 includes the substance of the exemplary method of Example 18, wherein the sparse source matrix comprises a predetermined number of rows and a predetermined number of columns, wherein the compressed format, when using the CSR format, further specifies a number of non-zero elements in each row, and specifies the matrix location as an index of the non-zero element within the row, and wherein the compressed format, when using the CSC format, further specifies a number of non-zero elements in each column, and specifies the matrix location as an index of the non-zero element within the column.

Example 21 provides an exemplary system to execute a sparse-dense matrix multiplication (SDMM) instruction, comprising: a memory; and a processor comprising: means for fetching, from code storage, the SDMM instruction having fields to specify an opcode, a dense output matrix, a dense source matrix, and a sparse source matrix having a sparsity of non-zero elements, the sparsity being less than one, means for decoding the fetched SDMM instruction, and means for executing the decoded SDMM instruction to, for each non-zero element at row M and column K of the sparse source matrix: generate a product of the non-zero element and each corresponding dense element at row K and column N of the dense source matrix, and generate an accumulated sum of each generated product and a previous value of a corresponding output element at row M and column N of the dense output matrix.

Example 22 includes the substance of the exemplary system of Example 21, wherein the SDMM instruction further specifies a size of data elements of the specified matrices, the size being one of 8 bits, 16 bits, 32 bits, 64 bits, and 128 bits, the size being specified either as an operand of the instruction or as part of the opcode.

Example 23 includes the substance of the exemplary system of Example 21, wherein the means for executing generates the products using multipliers having a same size as data elements of the specified matrices, generates the accumulated sums using accumulators having twice the size of the data elements of the specified matrices, and performs saturation and rounding on each of the accumulated sums before writing the saturated and rounded accumulated sum to the specified dense output matrix.

Example 24 includes the substance of the exemplary system of Example 21, wherein the sparse source matrix is stored in the memory in a compressed format, the compressed format including only the non-zero elements of the sparse source matrix, each non-zero element being represented by a data value and a matrix location, and wherein the compressed format is either a compressed sparse row (CSR) format storing the non-zero elements in row-major order, or a compressed sparse column (CSC) format storing the non-zero elements in column-major order.

Example 25 provides an exemplary non-transitory machine-readable medium containing instructions that, when executed by a processor, cause the processor to execute a sparse-dense matrix multiplication (SDMM) instruction by: fetching from code storage, using fetch circuitry, the SDMM instruction having fields to specify an opcode, a dense output matrix, a dense source matrix, and a sparse source matrix having a sparsity of non-zero elements, the sparsity being less than one, decoding, by decode circuitry, the fetched SDMM instruction, and executing, by execution circuitry, the decoded SDMM instruction to, for each non-zero element at row M and column K of the sparse source matrix: generate a product of the non-zero element and each corresponding dense element at row K and column N of the dense source matrix, and generate an accumulated sum of each generated product and a previous value of a corresponding output element at row M and column N of the dense output matrix.

Example 26 includes the substance of the exemplary non-transitory machine-readable medium of Example 25, wherein the execution circuitry generates the products using multipliers having a same size as data elements of the specified matrices, generates the accumulated sums using accumulators having twice the size of the data elements of the specified matrices, and performs saturation and rounding on each of the accumulated sums before writing the saturated and rounded accumulated sum to the specified dense output matrix.

Example 27 includes the substance of the exemplary non-transitory machine-readable medium of Example 25, wherein the sparse source matrix is stored in the memory in a compressed format, the compressed format including only the non-zero elements of the sparse source matrix, each non-zero element being represented by a data value and a matrix location, and wherein the compressed format is either a compressed sparse row (CSR) format storing the non-zero elements in row-major order, or a compressed sparse column (CSC) format storing the non-zero elements in column-major order.

Example 28 includes the substance of the exemplary non-transitory machine-readable medium of Example 25, wherein the execution circuitry comprises a single instruction multiple data (SIMD) execution circuit comprising a plurality of multipliers and a plurality of accumulators to execute the decoded SDMM on a plurality of the non-zero elements of the sparse source matrix in parallel, the plurality of non-zero elements comprising one of 16, 32, and 64 elements.

Example 29 includes the substance of the exemplary non-transitory machine-readable medium of Example 25, wherein the sparse source matrix is stored in the memory in a compressed format, the compressed format including only the non-zero elements of the sparse source matrix, each non-zero element being represented by a data value and a matrix location, and wherein the memory read circuit reads the sparse source matrix in the compressed format, and wherein the compressed format is either a compressed sparse row (CSR) format storing the non-zero elements in row-major order, or a compressed sparse column (CSC) format storing the non-zero elements in column-major order.

What is claimed is:

1. A non-transitory machine-readable medium storing instructions that includes a matrix multiplication instruction which, when executed by one or more processors, causes the one or more processors to perform operations, comprising:

loading a first plurality of source data elements of a first source matrix from a memory into a first one or more packed data registers or buffers of a processor, the first source matrix comprising a sparse matrix having a threshold proportion of source matrix elements with zero or null values, the first source matrix stored in a compressed format including non-zero source data elements and indicating positions of the non-zero source data elements in the first source matrix;

loading a second plurality of source data elements of a second source matrix from the memory into a second one or more packed data registers or buffers of the processor;

performing, by multiply-accumulate circuitry of the processor based on the matrix multiplication instruction, parallel multiply-accumulate operations with source data elements of the first source matrix and second source matrix, the parallel multiply-accumulate operations comprising:

identifying the non-zero source data elements of the first source matrix based on the positions indicated by the compressed format;

multiplying, by one or more multipliers of the multiply-accumulate circuitry, the non-zero source data elements of the first source matrix by corresponding data elements of the second source matrix to generate a plurality of products, the corresponding data elements of the second source matrix identified based on the positions; and adding, by one or more adders of the multiply-accumulate circuitry, the plurality of products to one or more accumulated values to generate data elements of a result matrix in a third one or more packed data registers or buffers of the processor.

2. The non-transitory machine-readable medium of claim 1 wherein each corresponding data element of the second source matrix is to be identified using a corresponding position of a non-zero data element of the first source matrix to identify a row and/or column in the second source matrix.

3. The non-transitory machine-readable medium of claim 1 wherein the second source matrix comprises a dense matrix.

4. The non-transitory machine-readable medium of claim 1 wherein the compressed format of the first source matrix comprises a compressed sparse row (CSR) format or a compressed sparse column (CSC) format.

5. The non-transitory machine-readable medium of claim 1 wherein the matrix multiplication instruction comprises a plurality of fields including a first field to specify an opcode, a second field to identify the result matrix, a third field to identify the first source matrix, and a fourth field to identify the second source matrix.

6. The non-transitory machine-readable medium of claim 1 wherein at least one of the first source matrix and the second source matrix comprises a machine learning activation matrix or a weight vector.

7. A method, comprising:

loading a first plurality of source data elements of a first source matrix from a memory into a first one or more packed data registers or buffers of a processor, the first source matrix comprising a sparse matrix having a threshold proportion of source matrix elements with zero or null values, the first source matrix stored in a compressed format including non-zero source data elements and indicating positions of the non-zero source data elements in the first source matrix;

loading a second plurality of source data elements of a second source matrix into a second one or more packed data registers or buffers of the processor;

performing, by multiply-accumulate circuitry of the processor based on a matrix multiplication instruction executed by the processor, parallel multiply-accumulate operations with source data elements of the first source matrix and second source matrix, the parallel multiply-accumulate operations comprising:

identifying the non-zero source data elements of the first source matrix based on the positions indicated by the compressed format;

multiplying, by one or more multipliers of the multiply-accumulate circuitry, the non-zero source data elements of the first source matrix by corresponding data elements of the second source matrix to generate a plurality of products, the corresponding data elements of the second source matrix identified based on the positions; and adding, by one or more adders of the multiply-accumulate circuitry, the plurality of products to one or more accumulated values to generate data elements of a result matrix in a third one or more packed data registers or buffers of the processor.

8. The method of claim 7 wherein each corresponding data element of the second source matrix is to be identified using a corresponding position of a non-zero data element of the first source matrix to identify a row and/or column in the second source matrix.

9. The method of claim 7 wherein the second source matrix comprises a dense matrix.

10. The method of claim 7 wherein the compressed format of the first source matrix comprises a compressed sparse row (CSR) format or a compressed sparse column (CSC) format.

11. The method of claim 7 wherein the matrix multiplication instruction comprises a plurality of fields including a first field to specify an opcode, a second field to identify the result matrix, a third field to identify the first source matrix, and a fourth field to identify the second source matrix.

12. The method of claim 7 wherein at least one of the first source matrix and the second source matrix comprises a machine learning activation matrix or a weight vector.

13. A processor, comprising:

a first one or more packed data registers or buffers into which a first plurality of source data elements of a first source matrix are configured to be loaded from a memory, the first source matrix comprising a sparse matrix having a threshold proportion of source matrix elements with zero or null values, the first source matrix stored in a compressed format including non-zero source data elements and indicating positions of the non-zero source data elements in the first source matrix;

a second one or more packed data register or buffers into which a second plurality of source data elements of a second source matrix are configured to be loaded from the memory;

execution circuitry configured to, based on a matrix multiplication instruction executed by the processor, perform parallel multiply-accumulate operations with source data elements of the first source matrix and second source matrix in a plurality of multiply-accumulate circuits of the processor, the execution circuitry comprising:

one or more multipliers configured to multiply non-zero source data elements of the first source matrix by corresponding data elements of the second source matrix to generate a plurality of products, the non-zero source data elements of the first source matrix identified based on the positions indicated by the compressed format, and the corresponding data elements of the second source matrix identified based on the positions; and one or more adders configured to add the plurality of products to one or more accumulated values to generate data elements of a result matrix in a third one or more packed data registers or buffers of the processor.

14. The processor of claim 13 wherein each corresponding data element of the second source matrix is configured to be identified by the execution circuitry using a corresponding position of a non-zero data element of the first source matrix to identify a row and/or column in the second source matrix.

15. The processor of claim 13 wherein the second source matrix comprises a dense matrix.

16. The processor of claim 13 wherein the compressed format of the first source matrix comprises a compressed sparse row (CSR) format or a compressed sparse column (CSC) format.

17. The processor of claim 13 wherein the matrix multiplication instruction comprises a plurality of fields including a first field to specify an opcode, a second field to identify the result matrix, a third field to identify the first source matrix, and a fourth field to identify the second source matrix.

18. The processor of claim 13 wherein at least one of the first source matrix and the second source matrix comprises a machine learning activation matrix or a weight vector.

* * * * *